United States Patent [19]

Lincoln et al.

[11] Patent Number: 5,935,525

[45] Date of Patent: Aug. 10, 1999

[54] AIR TREATMENT METHOD AND APPARATUS FOR REDUCTION OF V.O.C.S, NOX, AND CO IN AN AIR STREAM

[75] Inventors: Phillip A. Lincoln, Westland; Jessie E. Roberts, Belleville, both of Mich.

[73] Assignee: Tri-Mark Corporation, Detroit, Mich.

[21] Appl. No.: 08/742,880

[22] Filed: Nov. 1, 1996

Related U.S. Application Data

[60] Provisional application No. 60/006,148, Nov. 2, 1995.

[51] Int. Cl.⁶ .................................. A61L 9/00; A61L 9/20
[52] U.S. Cl. .................................. 422/121; 422/4; 422/24; 422/122; 422/186.3; 422/171; 422/177; 422/189; 96/224; 96/227
[58] Field of Search ...................................... 422/189, 196, 422/121, 123, 4, 24, 122, 186.3, 169–172, 177; 96/224, 227

[56] References Cited

U.S. PATENT DOCUMENTS

| | | | |
|---|---|---|---|
| 3,065,620 | 11/1962 | Houser | 68/13 |
| 3,130,570 | 4/1964 | Rentzepis | 68/13 |
| 3,194,628 | 7/1965 | Cannon | 8/137 |
| 4,017,735 | 4/1977 | Siegel | 250/430 |
| 4,141,830 | 2/1979 | Last | 422/24 |
| 4,156,652 | 5/1979 | Wiest | 250/527 |
| 4,179,616 | 12/1979 | Coviello et al. | 250/527 |
| 4,189,363 | 2/1980 | Beitzel | 250/527 |
| 4,214,962 | 7/1980 | Pincon | 204/157 |
| 4,230,571 | 10/1980 | Dadd | 210/760 |
| 4,372,935 | 2/1983 | Botton et al. | 423/393 |
| 4,419,331 | 12/1983 | Montalvo | 422/170 |
| 4,642,134 | 2/1987 | Van Antwerp et al. | 75/101 R |
| 4,857,277 | 8/1989 | Broomfield | 422/186.07 |
| 4,865,817 | 9/1989 | Burgess et al. | 422/168 |
| 4,913,827 | 4/1990 | Nebel | 210/748 |
| 5,045,288 | 9/1991 | Raupp et al. | 422/186.3 |
| 5,063,030 | 11/1991 | Sweetman | 422/189 |
| 5,078,876 | 1/1992 | Whittier et al. | 210/315 |
| 5,097,556 | 3/1992 | Engel | 8/158 |
| 5,241,720 | 9/1993 | Engel et al. | 8/158 |
| 5,256,379 | 10/1993 | DeLoach | 422/186.3 |
| 5,405,590 | 4/1995 | Macedo et al. | 423/210 |
| 5,676,913 | 10/1997 | Cirillo et al. | 422/170 |

OTHER PUBLICATIONS

Terr–Aqua Enviro Systems Air Pollution Control System Description Photochemical Processes for Water Treatment, *Chem. Rev.*, 1993, vol. 93, 671–698.

*Primary Examiner*—E. Leigh McKane
*Assistant Examiner*—Fariborz Moazzam
*Attorney, Agent, or Firm*—Reising, Ethington, Learman & McCulloch, PLLC

[57] ABSTRACT

An air abatement system that includes a pre-treatment system and an air treatment system for abatement of contaminated air that includes pollutants such as V.O.C.s, NOx, and/or CO. The air stream is treated using activated air, activated water, and ultraviolet light under conditions that produce hyroxyls, peroxides, and other oxidants without the formation of ozone. These oxidants are also utilized in the activated air, with the activated water being formed as an aqueous solution of the activated air. The pre-treatment system includes a quenching zone where activated water is misted into the air stream, followed by alternating reaction zones and depletion zones where activated air is added and then turbulently mixed with the air stream. The air treatment system includes a primary treatment tunnel, carbon bed system, activated air generator, and a sparger tank farm. Activated air produced by the generator as added into water while being exposed to ultraviolet light in the sparger tank farm. Then, as the contaminated air stream moves through various sequential chambers within the tunnel, it is subjected to the misted activated water, while being simultaneously exposed to ultraviolet radiation. Air exiting the tunnel is then further treated in the carbon bed system.

5 Claims, 9 Drawing Sheets

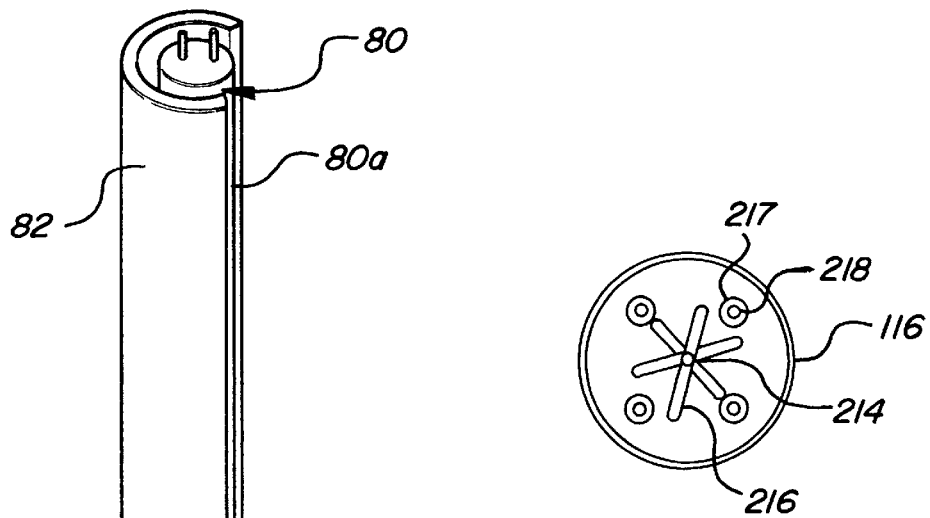
FIG-3A
FIG-5
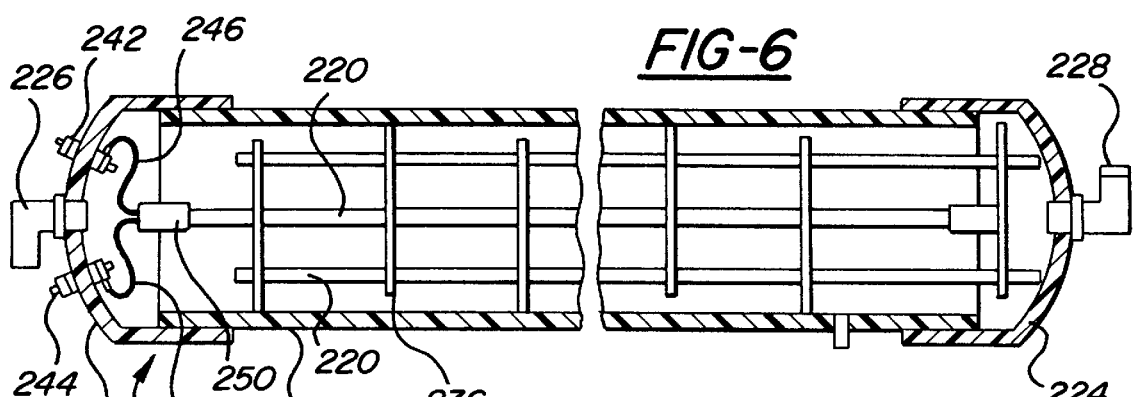
FIG-6
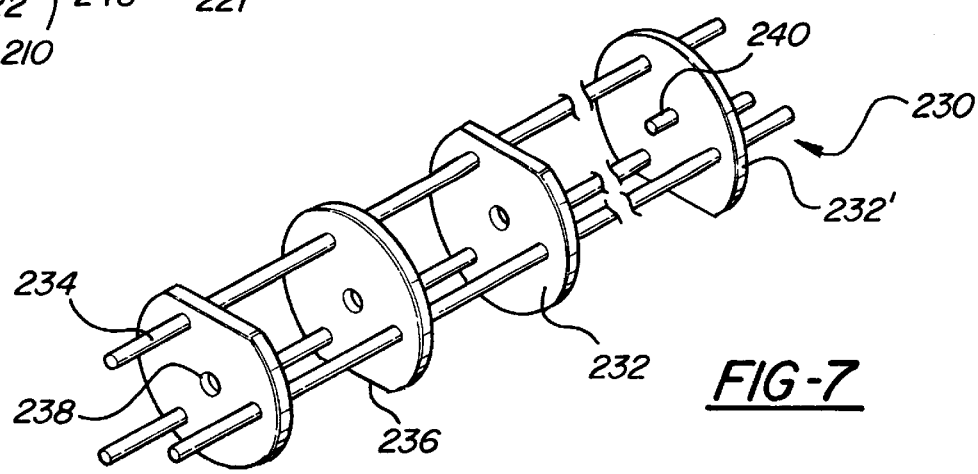
FIG-7

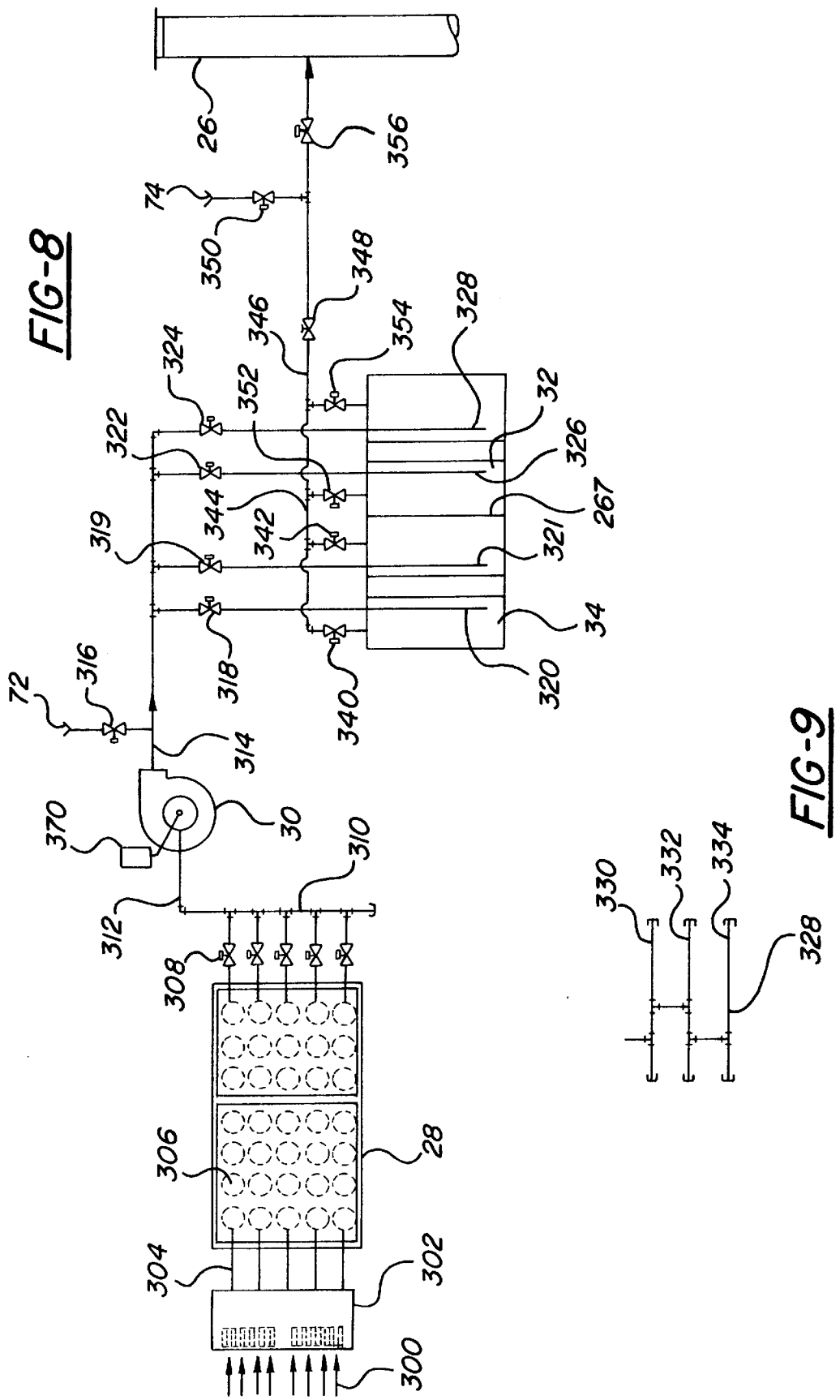

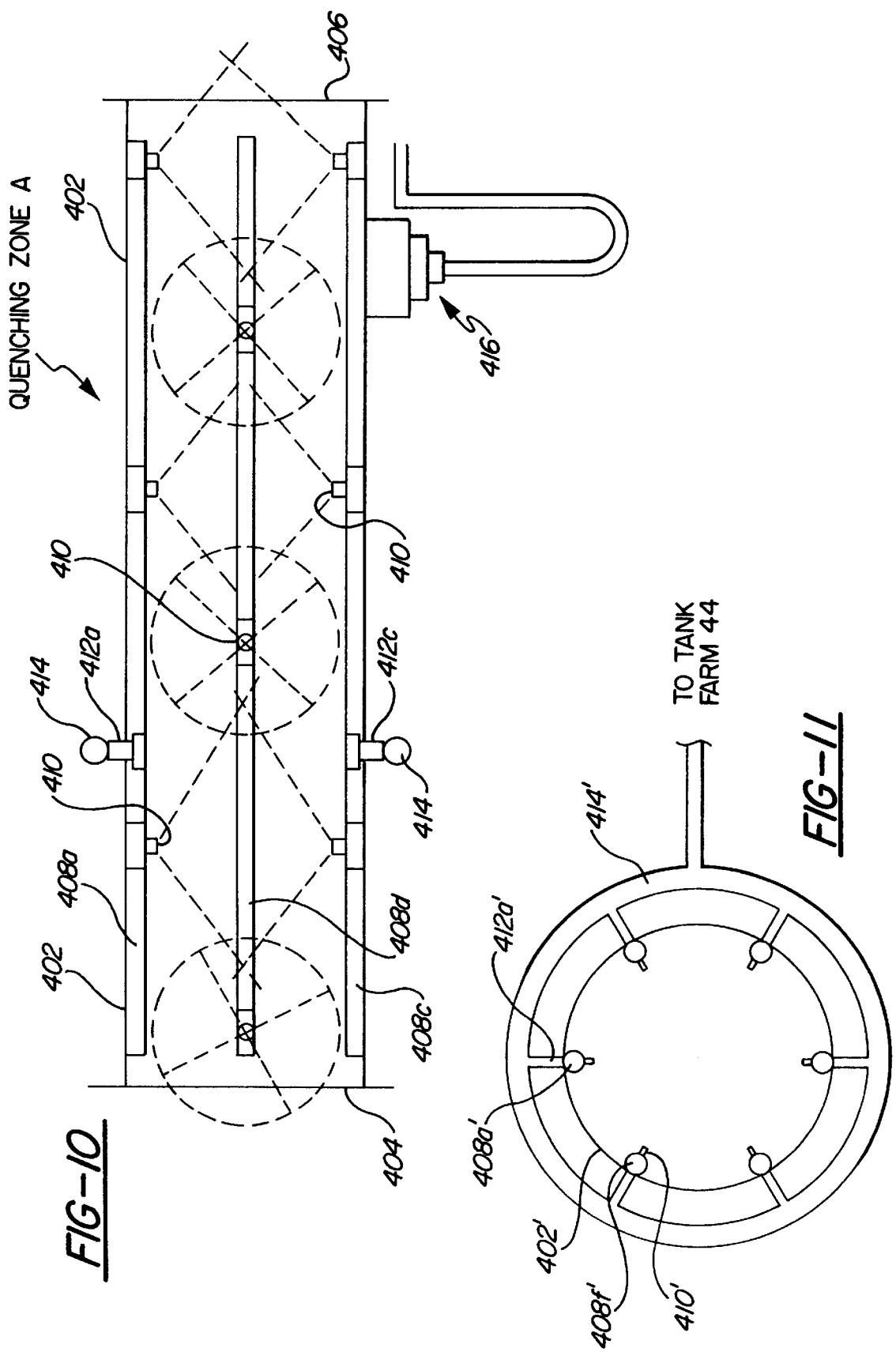

AIR TREATMENT METHOD AND APPARATUS FOR REDUCTION OF V.O.C.S, NOX, AND CO IN AN AIR STREAM

This application claims benefit of provisional application 60/006148 filed Nov. 2, 1995.

FIELD OF THE INVENTION

This invention relates generally to controlling environmental pollution and, more particularly, to a method and apparatus for reducing and destroying volatile organic compounds (V.O.C.s), NOx and CO in an exhaust air stream.

BACKGROUND OF THE INVENTION

V.O.C.s, NOx and CO have long been a major source of air pollution as an inevitable contaminant exhausted from many industrial processes including, for example, large industrial paint shops used in the automotive industry. Legislative efforts have established emission standards to control emission of such pollutants into the environment. Current and future compliance with such standards places a continuing demand on industry and creates an on-going need to reduce, degrade, and eventually destroy the pollutants in these emissions in a manner that is not cost prohibitive. This is particularly critical for manufacturers in industrialized countries who compete against sources operating in countries that do not have strict air pollution control laws.

In automotive paint shops, large volumes of solvent (V.O.C.) laden air must be removed from the paint spray booths and, to a lesser extent, from other paint shop operations, such as holding and quiet zones and paint bake ovens. For automotive paint shops, large quantities of solvent-laden air must be processed. Various techniques and combinations thereof have heretofore been used for V.O.C. abatement in paint shops.

Typically, scrubbers are used to capture inorganic chemicals and particulate paint from process exhaust air using liquids pumped through the scrubber. Any remaining paint particles are then removed from the exhaust air by filter banks with progressively increasing efficiencies. Less expensive filters are used in the initial stages to trap most of the larger paint particles. After filtering, the exhaust air stream is heated to reduce the humidity for a subsequent adsorption process. In the adsorption processes, solvent-laden air is concentrated into smaller quantities, typically 10% of the main exhaust airstream, and then processed. Typically, the concentration is accomplished by adsorbing the V.O.C.s into a carbon bed and then desorbing the carbon bed with hot air, hot inert gas or steam. The concentrated desorption product can then be finally processed through chemical treatment, solvent recovery or incineration.

Various incineration apparatus can be used to oxidize the solvents in a concentrated solvent-air mixture taken from the carbon beds. However, typically the mixture is heated to temperatures in excess of 1,400° F. When held at these high temperatures, the solvents react with oxygen, with the final reaction production products theoretically being harmless water vapor and carbon dioxide. Various types of thermal regeneration heat exchangers and the like are used to recoup heat from the incinerator exhaust to improve thermal efficiency. Direct incineration could be used but it generally has a low thermal efficiency, particularly for processing large volumes of V.O.C.-laden air. However, such prior art systems require large capacity carbon beds and have high energy costs for incineration.

Except in the most advanced systems, some off-site treatment and/or disposal is frequently required. For smaller installations, as contrasted to large automotive assembly plants, off-site carbon bed desorption may be most cost effective. In general, carbon beds, when used alone, are not effective or cost efficient for processing large volumes of V.O.C.-laden air. Special systems are required to desorb the carbon beds and, for many applications, this is accomplished off-site. Additionally, the desorption concentrate must still be treated for solvent removal and/or incineration. Incineration generally generates NOx or carbon monoxide and, without thermal recovery systems, has a direct thermal impact on the environment as well as requiring off-site disposal. Most importantly, prior art systems relying on high temperatures to complete oxidation are expensive to operate and may still require off-site disposal. These disadvantages, particularly when coupled with current and anticipated air and environmental pollution control, create an on-going need for improved V.O.C. abatement.

Another technique that has been utilized for abatement of V.O.C.s in industrial process air involves the use of ultra-violet (uv) light to break down the V.O.C.s directly and to form activated air containing oxygen in the form of ozone and other oxidants that also work to break down the V.O.C.s. As used herein, "activated air" should be understood to refer to air that has been treated, whether by exposure to ultra-violet light or some other method, to increase the concentration of oxidants in the air. Commercial systems are available that utilize this technique for abatement of solvents contained in process air exhausted from industrial paint booths, ovens, conformal coating areas, etc. A typical system includes a two-stage pre-filter, a photolytic reactor, an aqueous reactor, a coalescer, and a pair of granular carbon beds. Particulates of one micron and greater in size are collected and removed from the process air by the pre-filters. The air flow then passes through the photolytic reactor, where it is exposed to tuned ultraviolet light. Exposure of the process air to the ultraviolet light results in photochemical reactions that form ozone from the oxygen contained in the air, as well as peroxides from the moisture content within the air.

Oxidative degradation begins in the photolytic reactor due to both the newly formed oxidants and the direct exposure of the V.O.C.s to the ultraviolet light. The air stream is then scrubbed with ozonated water in the aqueous reactor. The ozonated water is generated by subjecting air to the ultra-violet lights and then injecting and mixing the activated air into the water. At this stage, water soluble hydrocarbons will collect in the water and will thereby be removed from the air stream. After passing through the aqueous reactor, the water vapor contained in the air stream is removed by the coalescer. The final stage in this process is to pass the air stream through a carbon bed for adsorption of any remaining V.O.C.s. A second carbon bed is utilized so that while one carbon bed in on-line to adsorb the V.0.C.s, the other is in the process of being regenerated using activated air containing ozone, hydrogen peroxide, and other oxidants produced photochemically by exposure of clean air to ultraviolet light.

The use of ultraviolet light to generate activated air containing ozone has also been implemented in various systems for treating water. For example, the following U.S. Pat. Nos. are each directed to the use of ozone and other oxidants in the wash water of a laundry washing system: 3,065,620, issued Nov. 27, 1962 to P. H. Houser; 3,130,570, issued Apr. 28, 1964 to P. M. Rentzepis; 3,194,628, issued Jul. 13, 1965 to P. Cannon; 5,097,556, issued Mar. 24, 1992 to R. B. Engel et al.; and 5,241,720, issued Sep. 7, 1993 to R. B. Engel et al. In these systems, ozone is produced by exposing air to ultraviolet radiation that is produced by either a corona discharge or ultraviolet lamps. The activated air containing ozone and, in some cases, hydrogen peroxide is mixed with the wash water to improve the cleaning of laundry and reduce or even eliminate the need for detergents.

The literature also suggests that substantial laboratory efforts have been directed to using ultraviolet radiation for other types of water treatment. See Legrini, Oliveros and Braun, "Photochemical Processes For Water Treatment," Chem. Rev. 1993 at pages 671 through 698, American Chemical Society Document No. 0009-2665/93/0793-0871. Ultraviolet radiation for water treatment is potentially useful not only for treating drinking water, but also for treating contaminated surface water, ground water and waste water. However, based upon the 221 biographical references cited and reviewed, the authors suggest that most such laboratory experimentation, with a few noted exceptions, have not been evaluated on a prototype basis, much less commercially.

Although the Chemical Review article is directed to water treatment as contrasted to V.O.C. abatement in industrial process air, some of the mechanics of oxidative degradation considered therein may be useful as background for the present invention. For example, Table I at page 674 (reproduced as "TABLE 1" below) confirms the oxidation potential of various oxidants believed to be available from the activated air and undoubtedly generated elsewhere in the system and process of the present invention as will be described.

TABLE 1

Oxidation potentials of Some Oxidants

| Species | Oxidation Potential (V) |
| --- | --- |
| fluorine | 3.03 |
| hydroxyl radical | 2.80 |
| atomic oxygen | 2.42 |
| ozone | 2.07 |
| hydrogen peroxide | 1.78 |
| perhydroxyl radical | 1.70 |
| permanganate | 1.68 |
| hypobromous acid | 1.59 |
| chlorine dioxide | 1.57 |
| hypochlorous acid | 1.49 |
| hypoiodous acid | 1.45 |
| chlorine | 1.36 |
| bromine | 1.09 |
| iodine | 0.54 |

Each of the foregoing references, as well as the literature describing the commercially available air treatment systems described above, all espouse the virtues of ozone and the use of ultraviolet radiation to generate that ozone. However, as shown in Table 1 above, ozone has a lower oxidation potential than hydroxyl radicals. Thus, ozone has less tendency to cause oxidation of the V.O.C.s than the hydroxyl radical; that is, it is less active than the hydroxyl radical. U.S. Pat. No. 4,214,962, issued Jul. 29, 1980 to A. J. Pincon, sets forth other disadvantages of creating ozone in addition to other oxidants formed by ultraviolet radiation; namely, the increase in surface tension of water with which it is mixed and the possible formation of carcinogenic substances. In that patent, an apparatus is disclosed for using ultraviolet light under 200 nanometers to generate an undisclosed activated oxygen product without the production of ozone. When used for treating water for human consumption or swimming pools, the apparatus can include a polyvinyl chloride enclosure to permit liberation of free chloride to provide chlorination of the water.

Not unexpectedly, however, since the Pincon patent is directed to the use of ultraviolet radiation for water treatment, it does not address the problems associated with processing large quantities of industrial process air laden with V.O.C.s, much less offer any direct solution to the problems and disadvantages of the various commercial processes that rely at least in part on the presence of ozone for V.O.C. abatement in the exhaust from paint spray booths.

There are many other industrial processes that produce exhaust air containing V.O.C.s, NOx, and CO. Such processes are utilized in the automotive, wood products, laundry dryers, furniture manufacture, foundries, plastic, stationary diesel and turbine generators, power plants, tanning, inks and printing, paper products, paper mills, and refineries.

Many of these industries utilize processes that generate large amounts of NOx. For example, in the wood products industry, dryers used in the manufacture of pressboard often burn available materials such as saw dust and wood chips to provide the heat needed for drying the pressboard. As a result, large amounts of NOx are produced. To help reduce the amount of NOx contained in exhaust air from these dryers, incineration is sometimes used. However, this process still results in thermal pollution and has only limited ability to reduce and destroy NOx in the exhausted air.

SUMMARY OF THE INVENTION

In accordance with the present invention there is disclosed a method of treating an air stream containing pollutants such as a V.O.C.s, NOx, and/or CO. The method includes: exposing a supply of humid air to ultraviolet radiation to produce a supply of activated air having reactive oxidants therein; forming an aqueous solution having the activated air dispersed therein; passing the air stream through a first zone; misting the aqueous solution into the first zone to thereby form a polluted aqueous solution containing at least some of the pollutants; removing at least some of the polluted aqueous solution from the first zone and introducing additional activated air into the polluted aqueous solution; passing the air stream from the first zone through a series of additional zones; and introducing the activated air into the additional zones as the air stream passes therethrough.

In accordance with another aspect of the invention, an apparatus is provided for treating an air stream containing pollutants such as V.O.C.s, NOx, and/or CO. The apparatus includes a plurality of zones, each of which has an inlet and an outlet and at least one wall defining an air passage between the inlet and the outlet. A first one of the zones has a plurality of water nozzles directed towards the air passage. The apparatus includes an activated air generator having an ultraviolet light contained in a housing. The inlet of the generator is connected to a source of humid air. The apparatus further includes an activated water generator having a first inlet for receiving a supply of water, a second inlet coupled to the outlet of the air generator, and an outlet coupled to the water nozzles. Activated air from the air generator is injected into the water to thereby form an aqueous solution containing oxidants from the activated air. The first zone has a drain coupled to the water generator to continuously recirculate the water through the water generator and the first zone. A second one of the zones has its inlet coupled to the outlet of the first zone and the second zone has an inner duct defining the air passage and an outer duct defining a supply plenum between the inner and outer ducts. The supply plenum is coupled to receive activated air from the air generator and the inner duct has perforations therein to permit introduction of activated air into the air passage. Preferably, the second zone includes a series of spaced baffles that form a restricted flow path through the second zone.

In yet another aspect of the invention, a method is provided for destroying NOx contained in an air stream having an elevated temperature. The method includes the steps of: exposing a supply of humid air to ultraviolet radiation to produce a supply of activated air having reactive oxidants therein; forming an aqueous solution having the activated air dispersed therein; passing an air stream having an elevated temperature through a passageway; lowering the temperature of the air stream by misting the aqueous solution into the air stream as it moves through the passageway, and introducing the activated air into the passageway as the air stream passes therethrough.

BRIEF DESCRIPTION OF THE DRAWINGS

A preferred exemplary embodiment of the present invention will hereinafter be described in conjunction with the appended drawings, wherein like designations denote like elements, and:

FIG. 3A is a perspective view of an ultraviolet lamp and deflector used in the tunnel of FIG. 3;

FIG. 5 is a sectional view through a sparger tank of the liquid subsystem of FIG. 4;

FIG. 6 is a view, partly broken away and in section, of a cell for generating activated air in the systems of FIGS. 2 and 4;

FIG. 7 is a perspective view of a baffle plate subassembly of the generator cell of FIG. 6;

FIG. 8 is a schematic view of an air flow system for regenerating carbon beds and exhaust recirculation in the air treatment system of FIG. 2;

FIG. 9 is a schematic view of regeneration piping for the carbon beds of FIG. 8;

FIG. 10 is a longitudinal cross-sectional view of the quenching zone of the pre-treatment system of FIG. 1;

FIG. 11 is an end view of an alternative embodiment of the quenching zone of FIG. 10;

DETAILED DESCRIPTION OF THE PREFERRED EMBODIMENTS

Figure 1:
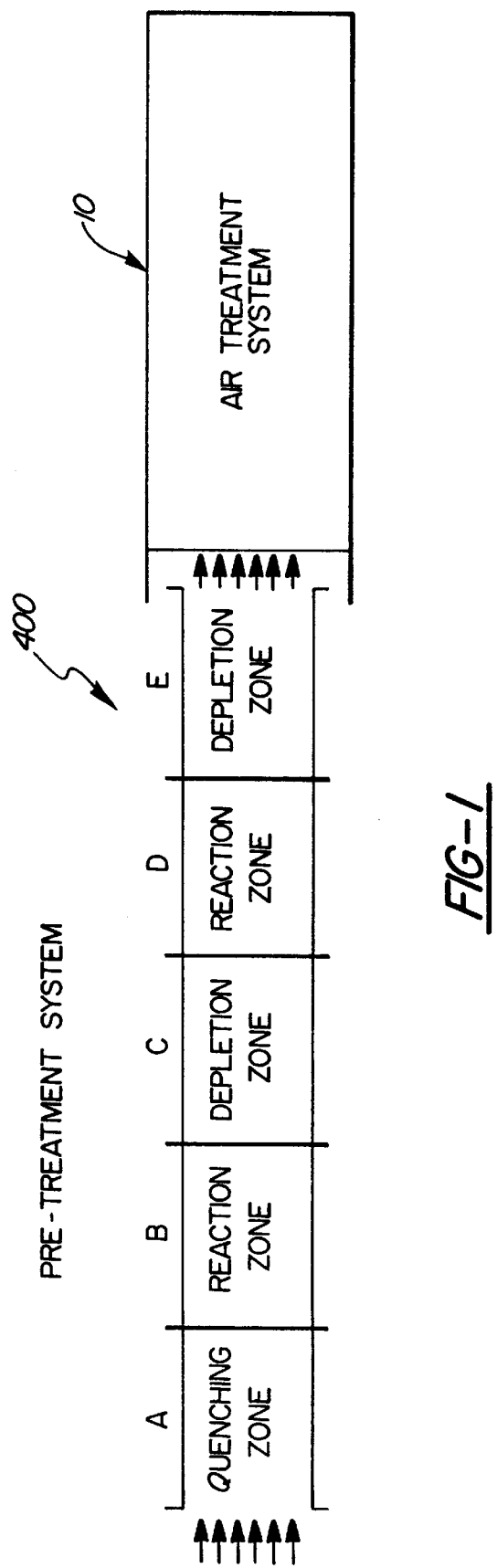
FIG. 1 is a diagrammatic overview of an air abatement system of the present invention.

FIG. 1 provides a diagrammatic overview of an air abatement system of the present invention. The air abatement system includes an air treatment system 10 and a pre-treatment system 400. Depending upon the application and contamination levels, only one of these two systems may be needed herein.

AIR TREATMENT SYSTEM

Overview of the Air Treatment System

Figure 2:
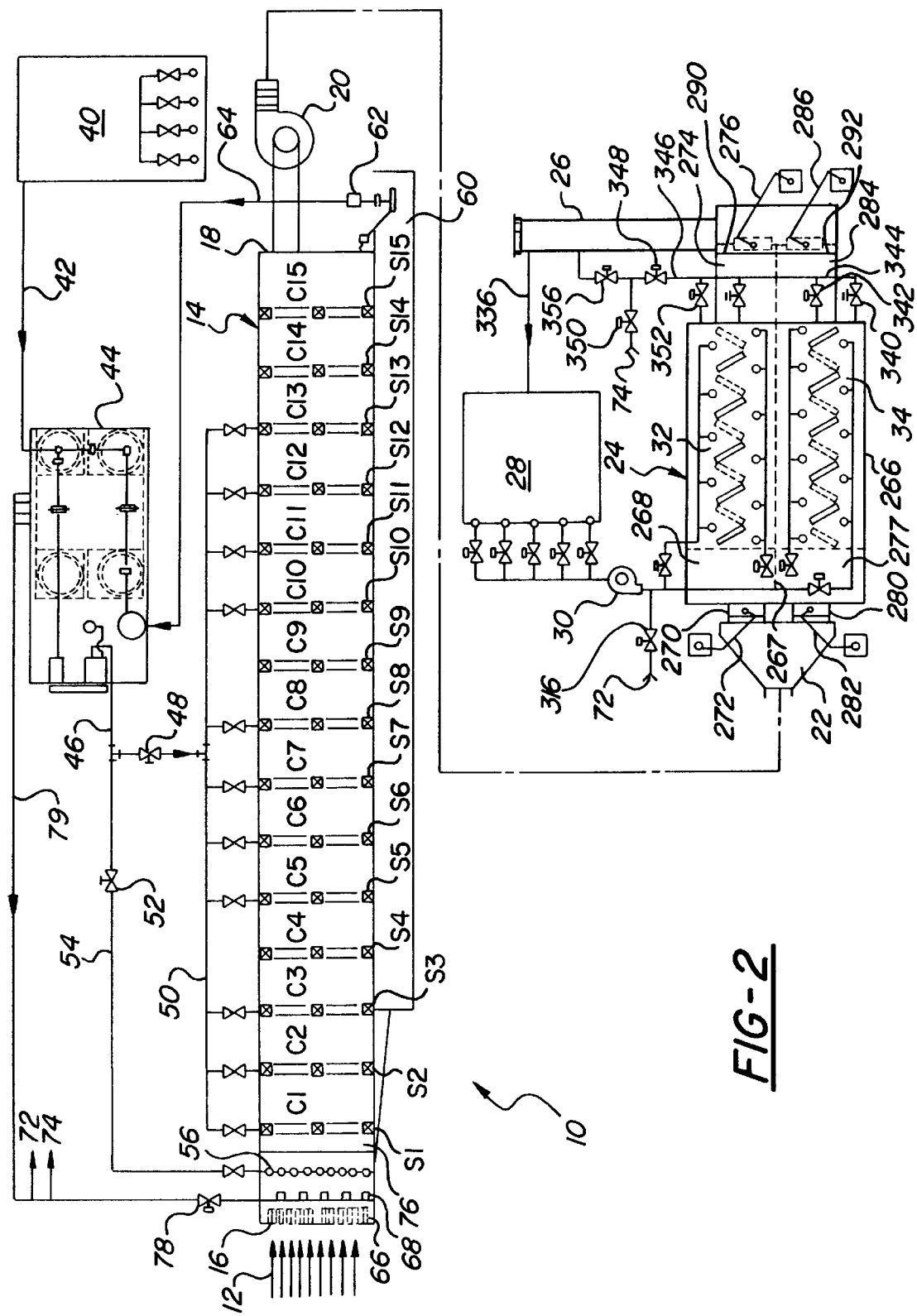
FIG. 2 is a schematic diagram of the air treatment system of FIG. 1.

FIG. 2 schematically shows a preferred embodiment of an air treatment system 10 as it would be used for handling large volumes of industrial process air containing V.O.C.s, NOx, and/or CO (hereinafter referred to as pollutants). As shown in FIG. 1, a polluted air stream 12 is drawn through a primary treatment tunnel 14 between an inlet 16 and an outlet 18 using a large centrifugal blower 20. Tunnel 14 continuously treats the air stream to destroy the pollutants within the air stream by oxidative degradation and photolysis. In general, this is accomplished within tunnel 14 by mixing the air stream with activated air and by direct exposure of the air stream to ultraviolet light. Blower 20 pushes the air exiting tunnel 14, along with any remaining pollutants, into an expansion chamber 22 and then through a carbon bed absorber-reactor system 24 which exhausts to the environment through exhaust stack 26.

As will be described below in greater detail, an activated air generator 28 produces activated air that is supplied via a second blower 30 to carbon bed system 24 and the upstream end of tunnel 14. Carbon bed system 24 comprises a pair of separate and isolated carbon beds 32, 34 so that when one of the carbon beds is on-line in the process and treating exhaust air from tunnel 14, the other carbon bed is being regenerated using the activated air from generator 28. The activated air from generator 28 contains a high level of oxidants which desorb and regenerate the off-line carbon bed.

Primary Treatment Tunnel

Referring back to the primary treatment tunnel 14, activated air containing a high level of oxidants is fed from a second activated air generator 40 via pipe 42 to a sparger tank farm 44 which, using ultraviolet radiation, generates an aqueous solution laden with newly-generated and reactivated oxidants. The oxidant laden solution is then fed via pipe 46, solenoid operated valve 48 and header 50 to various selected modular sections S1 through S15 where it is introduced as an activated fog into various selected tunnel chambers C1 through C15 to maintain an oxidant-enriched, high-humidity environment within tunnel 14. This oxidant-enriched, high-humidity environment performs various important functions, as will later be described in greater detail. Oxidant laden solution from sparger tank farm 44 is also fed via pipe 46, solenoid valve 52 and pipe 54 to an array of nozzles 56 which also provide an oxidant-enriched, high-humidity environment downstream of a set of primary particulate filters 66 at the inlet 16 of tunnel 14. Also located downstream of inlet 16 is an array of activated air nozzles 68 that are connected to a tap 74 to receive partially spent activated air exhausted from the regeneration of carbon bed system 24. In this way, any pollutants contained in this regeneration exhaust gas will be recirculated through air treatment system 10. These nozzles also receive activated air vented from sparger tank farm 44, as will be described below. Further, these nozzles are also connected to a second tap 72 that can be used to provide newly generated activated air from generator 28 in the event greater oxidative activity is required in tunnel 14.

Activated aqueous solution (also referred to as activated water) is introduced into tunnel 14 via nozzles 56 and nozzle header 50, which precipitates, condenses and/or is filtered out of the air stream 12, is collected in a supply tank 60 from which it can be recirculated via a pump 62 and a pipe 64 back to tank farm 44 where it is remixed with activated air from generator 40 and exposed to ultraviolet radiation to provide a continuous recirculating supply of oxidant enriched fog to tunnel 14.

Advantageously, each of the modular sections, S1–S15 can be fully or partially constructed off site. The modular sections include framing, structural members, plumbing, fittings and some electrical wiring for various functional components, i.e., ultraviolet lamps, mist nozzles, Viledon filters, carbon filters and catalyst plates, some of which can also be preassembled in the modules. Sparger tank farm 44 and carbon bed system 24 can also be partially assembled off site as modules. External housing panels for tunnel 14 are fabricated and erected on site, preferably of stainless steel sheet metal to form chambers C1–C15. After completing all of the sheet metal fabrication and ductwork, the necessary piping, valving and electrical wiring connections are made and the system cleaned and flushed before final installation of nozzles and ultraviolet lamps.

Although an understanding of the present invention will be more fully apparent from the detailed descriptions to follow, in general, the industrial process air stream 12 entering tunnel 14 is filtered at filters 66 to remove particulates. It is then blended with the oxidant-enriched fog from nozzles 56 and with gaseous activated air from nozzles 68. The mixture then enters an expansion chamber 76 which allows the air stream to equalize and load the unit to a uniform flow. As the air stream continues moving from left to right as viewed in FIG. 2, it passes through the series of treating chambers, C1 through C15, defined between corresponding modular sections S1 through S15, where the V.O.C.s, NOx, and/or Co are at least partially destroyed by photodecomposition and oxidative degradation.

As air stream 12 passes through chambers S1 through S15, it is repeatedly exposed to ultraviolet radiation in the oxidant-laden, high-humidity environment. Activated air fog is repeatedly replenished via header 50 in selected modular sections S1 through S15. As the V.O.C. laden air stream moves through various filters, precipitators and coalescers, particulate water, together with water-soluble compounds, are collected in supply tank 60. Preferably, selected coalescers are perforated plates coated with a catalyst, such as titanium dioxide, which provides hydrogen for production of hydroxyl and other oxidants to thereby enhance the oxidative degradation of the pollutants. The perforated plates, and to a lesser extent the filters, also act as scrubbers to mix and bring the activated air fog, oxidants and pollutants in intimate contact with one another. Preferably, various other components in the system are made of PVC to serve as catalysts.

Water from supply tank 60 is recirculated into the sparger tank farm 44, mixed with the activated air from generator 40, exposed to further ultraviolet radiation, and reintroduced into tunnel 14. Except for high humidity vapor discharged from the tunnel, together with any remaining airborne pollutants, water and any water-soluble intermediaries from degradation of the pollutants are recirculated in a substantially closed system until all remaining intermediate reaction products are reduced to water and/or carbon dioxide.

Activated Air

As will be described in greater detail below, the activated air supplied by generator 40 is produced by exposing humid air to ultraviolet radiation to produce oxidant radicals, preferably under turbulent flow conditions and in the presence of a catalyst to enhance oxidant generation and produce additional oxidants. Normally, plant air is used as the fresh air supply for generator 40 with a humidity level of 85% being typical. If necessary, humidity can be introduced into the air at generator 40 by, for example, wicking water into the plant air. The ultraviolet light preferably includes 184.9 nm and 254 nm wavelengths, which can be achieved by enclosing an ultraviolet lamp in a suitable quartz lens, as will be described below.

Table 2 lists the relative percentages of the various oxidants and other constituents believed to be in the activated air. The percentages given indicate the relative amounts in the approximately 20% of the activated air that includes oxygen and oxygen bearing compounds.

TABLE 2

| Constituent | Percent by Volume of Air Excluding Nitrogen |
|---|---|
| Nitrogen Dioxide ($NO_4$) | 0.1% |
| Atomic oxygen $O_1$ | 4.4% |
| Hydrogen Peroxide ($H_2O_2$) | 12.6% |
| Hydroperoxy Radical ($HO_2$) | 29.4% |
| Hydroxyl Radical (OH) | 6.0% |
| Oxygen ($O_2$) | 45.5% |
| Other Oxidants such as $NO_2$, $N_2O$ | <1.0% |
| Other gases such as $NH_2$, $NH_3$, $C_2$, $N_2$, HCN, CI | <1.0% |

As Table 2 above indicates, even though the ultraviolet light includes the 184.9 nm wavelength that is known to cause formation of ozone ($O_3$) in air, no ozone is present in the resulting activated air produced by generator 40. This is believed to result from the presence of humidity in the supply air which provides a hydrogen rich environment that allows any ozone to almost immediately split and form hydroxyl radicals. This is also believed to result from photolysis of the ozone caused by the 254 nm ultraviolet light.

When the activated air is generated by exposure to ultraviolet radiation in the presence of a catalyst, such as polyvinylchloride, it is believed that the following additional radicals are produced:

TABLE 3

| Radicals |
|---|
| $C_2Cl^-$ |
| $Cl^-$ |
| $Cl_2$ |
| $ClOH^-$ |
| $H_2O_3Cl^-$ |
| $H_2Cl^-$ |
| $HOCl^-$ |

These radicals further help split the ozone, freeing up oxygen that can then combine with available hydrogen to form the highly active hydroxyl radicals.

Without wishing to be limited to any theoretical explanation, it is believed that, by splitting up the ozone almost as soon as it is generated, the oxygen from the ozone is available to form hydroxyl radicals that have a higher oxidation potential and are therefore more effective than ozone at destroying the pollutants. In this way, the activity level of the activated air can be enhanced. Furthermore, the oxidants produced are negatively charged, and this is believed to result in enhanced degradation of the pollutants. Preferably, the relative humidity of the plant or other fresh air used to generate activated air is at least 25% and, more preferably is within the range of 75–100% and, even more preferably is in the range of 90–100%.

The activated air is then dissolved as best as possible into an aqueous solution at sparger tank farm 44. The resulting activated aqueous solution is then introduced into tunnel 14 as an activated fog that mixes with air stream 12 as it passes through tunnel 14. The air stream is kept at a high level of activity via direct ultraviolet radiation in the high humidity environment. Photodecomposition initiates cleaving of the pollutants and oxidative degradation begins in at least the first chamber, C1. As the air stream moves through the tunnel, cleaving of the compounds and oxidative destruction continue at an accelerated rate as reaction products in solution are filtered and precipitated out of the air stream and returned to supply tank 60.

As indicated above, destruction of V.O.C.s, NOx, and CO according to the present invention is believed to occur by a combination of two phenomena, namely oxidative degradation of the pollutants by oxidants contained in the activated air in gaseous and fog states, and by photolysis occurring simultaneously and undoubtedly synergistically, in tunnel 14 due to repeated exposure of the air stream to ultraviolet radiation in a high-humidity environment. Consequently, tunnel 14 can be utilized in and of itself to provide acceptable V.O.C. abatement without further treatment at carbon beds 32, 34.

Tunnel Chambers

In general, tunnel 14 incorporates particulate filtration, misting or fogging, ultraviolet light activation, coalescers, carbon filters for surface reactions, and preferably one or more catalysts. One or more of these functions is incorporated in each of the modular sections S1 through S15. Further, these functions are carried out in a predetermined sequence so that the processes and reactions occurring in chambers C1 through C15, individually and in sequence, optimize the destruction of pollutants occurring in tunnel 14.

Figure 3:
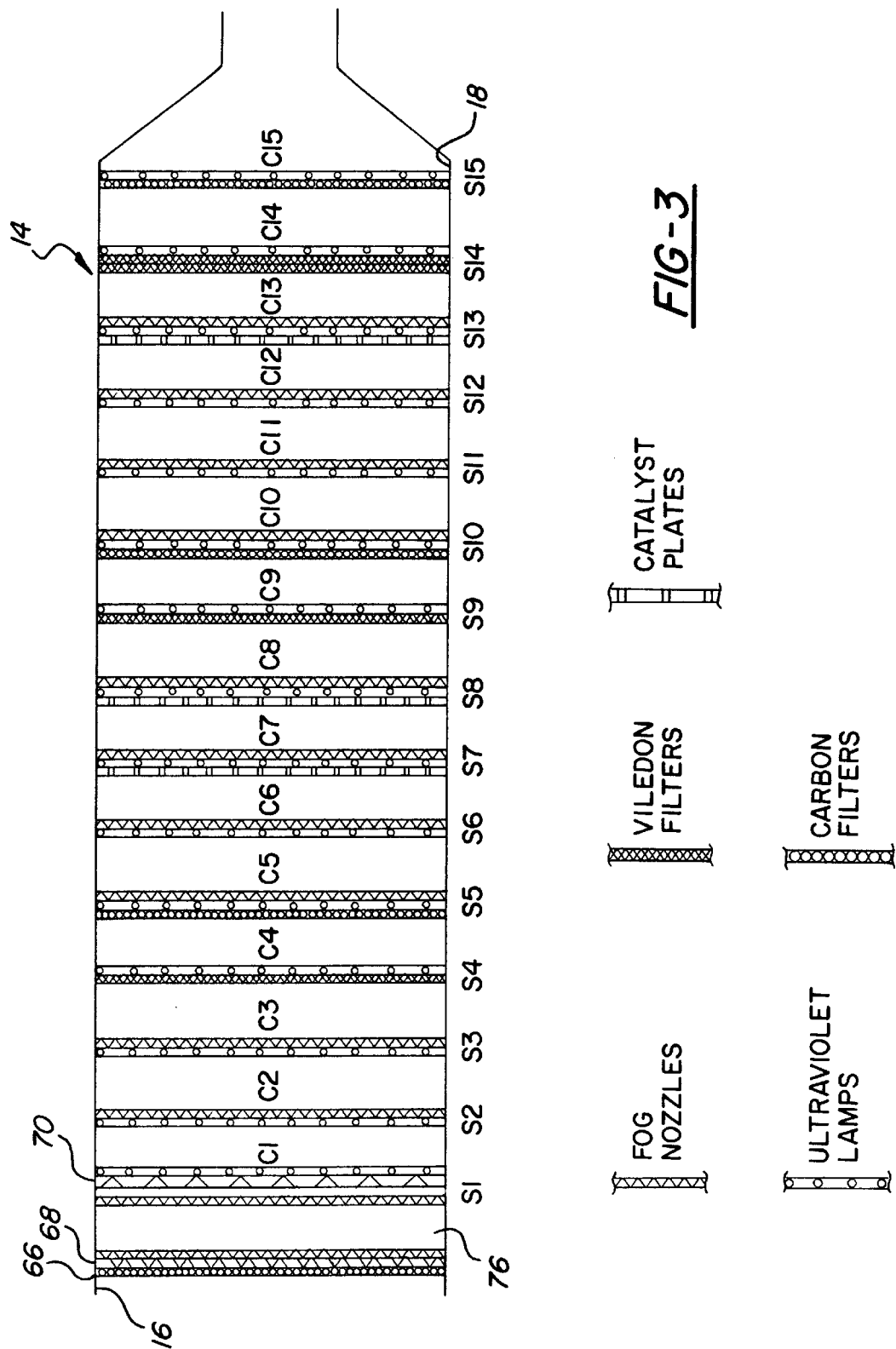
FIG. 3 is a diagrammatic view of a primary treatment tunnel of the air treatment system of FIG. 2 showing the location and relative positioning of the various components used in the tunnel.

As shown in FIG. 3, the modular sections S1 through S15 in tunnel 14 are as follows:

Section S1: Mist nozzles, mixing cones, and ultraviolet lamps.
Section S2: Ultraviolet lamps and mist nozzles.
Section S3: Ultraviolet lamps and mist nozzles.
Section S4: Viledon filters and ultraviolet lamps.
Section S5: Carbon filters, ultraviolet lamps and mist nozzles.
Section S6: Ultraviolet lamps and mist nozzles.
Section S7: Perforated catalyst plates, ultraviolet lamps, and mist nozzles.
Section S8: Perforated catalyst plates, ultraviolet lamps, and mist nozzles.
Section S9: Viledon filters and ultraviolet lamps.
Section S10: Carbon filters, ultraviolet lamps and mist nozzles.
Section S11: Ultraviolet lamps and mist nozzles.
Section S12: Ultraviolet lamps and mist nozzles.
Section S13: Perforated catalyst plates, ultraviolet lamps, and mist nozzles.
Section S14: Double Viledon filters and ultraviolet lamps.
Section S15: Carbon filters and ultraviolet lamps.

The illustrated embodiment is based on an air stream flow rate of 22,500 ACFM to 36,000 ACFM at an average overspray of 22 lbs. per hour to reduce V.O.C. concentrations from upwards of 100 ppm to no more than 12 ppm per volume, which is less than half the current EPA standards of 25 ppm. This system is manufactured in modular sections so that it can be easily sized for any flow rate or volume of V.O.C.s. For example, for smaller flows (22,500 to 36,000 ACFM), a single generator 40, tank farm 44, and tunnel 14 can be used. For larger flows (50,000 ACFM), a pair of tunnels 14 could be connected in parallel and run from a single generator 40 and tank farm 44. For very large flows (72,000 ACFM), a pair of tunnels could be used with a pair of generators 40 supplying activated air to tank farm 44 at the rate needed to provide a suitable level of activated air within the water provided to the two tunnels. For a capacity of 36,000 ACFM, tunnel 14 is 12 ft. wide, 12 ft. high, and 56 ft. long, preferably made into two modular sections, each 28 ft. long. The walls and roof are stainless steel, welded air tight.

Entrance sections are separately fabricated to house filters 66, activated air nozzles 68, fog nozzles 56, and expansion chamber 76. In the embodiment described, inlet 16 is designed so that the cross-sectional velocity does not exceed 450 ft. per minute and three separate filter sections are used to progressively filter out particulates, e.g., the average efficiency of the first filter is seventy-two percent (72%) on particles of 4 micron size and greater, the second filter has an average efficiency of eighty-five percent (85%) on particles of 2 micron size and greater, and the third filter had an average efficiency of no more than ninety-six percent (96%) on particles of 1 micron size and greater. All of the filters were made of synthetic organic fibers to operate at one-hundred percent (100%) relative humidity without deterioration or shedding of the fibers. The filters can be built up of sections, about two feet by two feet, two to four inches deep, to fill the cross section of the tunnel, e.g., six filters across for a width of 12 ft. and six filters high for a 12 foot height. Suitable filters are available from Eaton Air Filter of 2338 Cole Street, Birmingham, Mich. 48009. Similar filter sections are typically used in prior art carbon bed systems with incineration.

The array of activated air nozzles 68 consists of forty-eight nozzles capable of delivering up to about 150 cubic feet per minute of air from tank farm 44, tap 74, and/or generator 28 via tap 72. A normally open, electronically controlled valve 78 is used to control the flow of air to nozzles 68. The array of fogging nozzles 56 at inlet 16 is designed to instantly achieve high humidity in expansion chamber 76, for example by using 192 fog nozzles such as stainless steel nozzles with ruby orifice to produce a fog, ASI #006 at 0.033 gallons per minute at 1,000 psi. Expansion chamber 76 may be about two feet long to allow the air stream 12 to equalize and load the system to a uniform air flow.

In each of the modular sections S1 through S15, the lamp portion of the modular section includes an array of 16 ultraviolet lamps 80, one of which is shown in FIG. 3A. Each of the lamps include a lamp tube 80*a* made from a high-output ozone LH quartz lens 80*a*, that permits transmission of radiation in the wavelength range of from 184.9 nanometers to 254 nanometers. Lamps of this type are available from Voltrac Technologies, 186 Linwood Avenue, Fairfield, Conn. 06420-0688. The lamps are four feet long and are mounted in a two-section frame, each frame section holding eight lamps extending in a vertical direction. Alternatively, lamps 80 can be mounted such that they extend in the horizontal direction, with access openings in the sides of tunnel 14 to allow the lamps to be changed from the outside of tunnel 14 without having to shut down operation of abatement system 10. Each lamp 80 also has an upstream shield or deflector 82, cut from 3-inch PVC pipe, leaving a 240° radiant section intact and a 120° window through which radiation is emitted into the downstream chamber. The PVC deflector operates as a catalyst, providing the various radicals listed previously in Table 3 that aid in the destruction of the pollutants within air stream 12. Preferably, the PVC used is Schedule 80 which will provide the desired radicals, yet is dense and will not break down too quickly.

Section S1 includes an array of mixing cones 70 comprising 180 relatively small double-cone venturies to optimize mixing of air stream 12 with the aqueous fog from nozzles 56 and gaseous activated air from nozzles 68. These cones homogenize the air stream with activated fog and activated air from nozzles 56 and 68, respectively, to form a homogenous mixture.

The nozzle portion of sections S1–S3, S5–S8, and S10–S13 each include thirty-five nozzles directed downstream and mounted on seven vertical headers with five nozzles per header. The seven vertical headers are staggered between the eight vertical lamps, in the space between the lamp shields. As the air stream moves through tunnel 14, it is deflected around the lamps and into the fog exiting from the nozzles. The nozzle section is made of stainless steel mounted on stainless steel struts. Again, the mist nozzles are of stainless steel with ruby orifice to produce a fog, ASI #006 at 0.033 gallons per minute at 1,000 psi.

In the filter and lamp sections S4, S9, and S14, the filter can be made up of 25 sections, approximately 24"×24"×1" thick, mounted in stainless steel frames and backed on both sides by stainless steel wire mesh. A suitable filter material is Viledon, sold commercially by Eaton Air Filter of Birmingham, Mich. Preferably, the Viledon filters remove particulate water and other particles down to at least five microns in size and, even more preferably, down to about one micron in size. The ultraviolet lamp portions of these sections can be identical to the lamp array previously described, and can be located immediately downstream of the filters.

In each modular section S5, S10, and S15, twenty-five coconut carbon filters approximately 24"×24"×1⅞" thick are installed in a stainless steel framework so that all of the air moving through the tunnel 14 must pass through the carbon filters. Preferably the filters have interior cross-bracing and are backed at the downstream side by a perforated stainless plate that supports the coconut carbon filters and ensures that all of the air moving in tunnel 14 passes through the carbon filters. In modular sections S5 and S10, the ultraviolet lamp portion and the mist nozzle portions are immediately downstream of the carbon filters and have the construction previously described.

The perforated catalyst plate portions of sections S7, S8, and S13 are each fabricated from six standard ferrous punch plates, each approximately 4'×6', 16 gauge, perforated with ¼" holes, ¼" off center and mounted in a frame to fill the tunnel. The perforated plates are heavily coated with a high hydrogen shift catalyst, for example, titanium dioxide applied with an ultraviolet-resistant adhesive. Other catalysts can be used, including a titanium-ferrous catalytic mix, a copper zinc catalytic mix, a copper silver catalytic mix, and copper zinc-silver catalytic mix. The lamp and nozzle portions of sections S7, S8, and S13 are of the same construction as set forth hereinabove and are located just downstream of the perforated catalyst plates. Preferably, only the upstream surface of the plates are coated with the catalyst, leaving the ferrous material of the inner surface of the perforations and the backside of the plates exposed. By providing an exposed ferrous surface, the ultraviolet light and peroxide radicals can react with the iron in the plates to liberate hydrogens needed to produce the highly active hydroxyl radicals.

With the arrangement of tunnel 14 described hereinabove, as soon as the air stream 12 enters tunnel 14, the pollutants and the oxidants begin to be wetted and some oxidative degradation begins immediately upon air stream 12 becoming mixed with the activated air from nozzles 68 and the activated fog from nozzles 56. This step may be viewed as a pre-treatment for further oxidative degradation and photolysis in tunnel 14 and may not be required for some applications. In the illustrated embodiment, this initial step provides a convenient and preferred location for recirculating some of the active solution in supply tank 60 in a closed loop through sparger tank farm 44 and tunnel 14. Similarly, inlet 16 of tunnel 14 provides a preferred location for introducing vented activated air from tank farm 44 and also for continuously recirculating partially spent activated air exhausted from carbon bed system 24.

As the air stream progresses through chambers C1 through C15, it is progressively and continuously treated by direct exposure to ultraviolet light and oxidant laden fog. The ultraviolet radiation in chamber C1 not only continues to activate the fog by regenerating oxidants, but it also begins photolysis of the pollutants at least initiating wetting, cleaving, and photodecomposition of the pollutants. Simultaneous oxidative decomposition of the pollutants occurs due to the high level of oxidants in the activated fog. Further oxidative degradation and photolysis occurs as air stream 12 moves through chambers C2 and C3.

As the stream passes out of chamber C3 and through the Viledon filters in section S4, the filters remove particulate water, together with water-soluble intermediate radicals, compounds and the like, and the filtrate is collected in supply tank 60. The Viledon filters allow only humidity, gaseous pollutants, and activated air in gaseous form to pass into chamber C5 where the air stream is again irradiated by ultraviolet radiation still in a high-humidity environment but without dense activated fog. This is believed to enhance more direct irradiation of the pollutants due to reduced scattering and absorption of the radiation as compared to a dense fog environment. However, the humidity in chamber C5 is sufficiently high (95–100% relative humidity) to cause formation of new hydroxyl radicals from any ozone generated therein by the ultraviolet lamps. Moreover, it is believed that oxidants are continuously deposited on the carbon filter surfaces in Section S5 at the downstream end of chamber C4 for surface reaction with photodecomposed V.O.C. products. To some extent, these surface reactions may be influenced by ultraviolet radiation reaching the carbon filters.

In chambers C5 and C6, the air stream again moves through a high-humidity, dense fog environment with prolonged activation by ultraviolet radiation. This causes further oxidant generation and photochemical and oxidative decomposition of the V.O.C.s, NOx, and CO. As the air stream reaches section S7 at the downstream end of chamber C6, the catalytic plates serve as scrubbers to force activated fog, oxidants, and pollutants into intimate contact with one another. Activated fog also condenses on the catalytic plates to remove water-soluble compounds, intermediate radicals and the like. The reactions occurring have been found to be enhanced by the catalysts present. It is believed that the catalysts cause a high hydrogen shift which promotes breakdown of the pollutants, oxidative degradation and/or oxidant generation.

Chambers C7 and C8 are also highly active due to ultraviolet radiation combined with additional infusions of activated fog. Cleaving, wetting and photochemical and oxidative decomposition continue, probably at an accelerated rate, before being filtered at section S9. In chamber C9, as in chamber C4, the air stream enters in a high-humidity condition but without dense active fog. As in chamber C4, ultraviolet irradiation of the pollutants is more direct and efficient. Fresh oxidants are produced, photochemical and oxidative decomposition continues, but ozone production is still inhibited. Carbon filters at the upstream end of section S10 perform as in section S5, followed by a high level of activity in chambers C10–C12, as in chambers C5 and C6, due to replenished activated dense fog and repeated ultraviolet radiation. As the pollution concentration levels continue to drop, photochemical and oxidative decomposition undoubtedly are more effective and efficient as the pollutants migrate through the activated fog and are exposed to ultraviolet radiation and oxidants in chambers C10–C12.

At section S13, as at section S7, the air stream, oxidants and fog are scrubbed and coalesced in the presence of a catalyst by perforated catalyst plates with any condensation flowing into tank 60. Extended exposure to ultraviolet radiation and dense active fog is repeated in chamber C13, as in chamber C8, progressively achieving still further photochemical and oxidative destruction before filtering at section S14.

At section S14, particulate water is removed by Viledon filters, along with water-soluble reaction radicals, compounds and the like. In chamber C14, as in chambers C4 and C9, the air stream is exposed to ultraviolet radiation in a high humidity environment, but without dense fog before passing through the carbon filter in section S15. Chamber 14 therefore provides a direct and efficient irradiation of the remaining pollutants, not only in the air stream but also on the surface of the carbon filters in section S15. Reactivation of the air stream in chambers C14 and C15 by ultraviolet radiation continues destruction of the pollutants and provides additional oxidants that aid in any further oxidative destruction required at the carbon bed system 24.

As will be apparent from the above process description, repeated ultraviolet radiation of air stream 12 occurs in a high-humidity environment, whether as a dense fog, as in chambers C1–C3, C5–C8, and C10–C13, or as a gaseous humidity, as in chambers C4, C9, C14, and C15. This insures a continuously replenished supply of oxidants for reaction with photochemically decomposed pollutants. Additionally, the sustainable formation of ozone, as would be expected with dry air, does not occur in the high humidity environment maintained throughout tunnel 14. Experimental analysis has not revealed any detectable ozone exiting from tunnel 14. Analysis confirmed that the exiting gas from chamber C15 does not contain ozone. It is believed that any ozone produced is quickly decomposed by one or more of a variety of phenomena, including the presence of high humidity, photolysis by the 254 nm ultraviolet radiation, and cleavage due to chlorine and other radicals that were liberated from the catalysts as a result of being exposed to the ultraviolet light.

It has been determined empirically that the present invention effectively and efficiently destroys pollutants to levels well below the current accepted standards as indicated in Table 4.

TABLE 4

| SYSTEM REDUCTION | INLET[1] | BEFORE CARBON BED[1] | CARBON BED[2] | OUTLET[1] |
|---|---|---|---|---|
| Without tunnel 14 MAK (ratio of 2:1) Xylene | 56 ppm | 56 ppm | 50,000 ppm[3] 25,000 ppm[3] | 14 ppm |
| With tunnel 14 MAK (ratio of 2:1) | 56 ppm | 30 ppm | 0.180 ppm[3] 0.170 ppm[3] | 0.688 ppm |

TABLE 4-continued

| SYSTEM REDUCTION | INLET[1] | BEFORE CARBON BED[1] | CARBON BED[2] | OUTLET[1] |
|---|---|---|---|---|
| Xylene | | | | |

[1]Measured by Photorae ionization instrument averaged over a 33 hour run.
[2]Measured by an independent laboratory, Swanson Environmental Inc.
[3]Samples were removed after 8 hours of V.O.C. spray prior to regeneration. The amounts shown therefore represent the residual amount left on carbon before the regeneration process.

Although the present invention preferably utilizes further oxidative degradation in carbon bed system 24, it will be apparent from Table 4 that the treatment in tunnel 14 alone resulted in a reduction from 56 parts per million to 30 parts per million which, even without subsequent treatment in the carbon bed system 24, may be more than adequate to meet applicable standards.

Liquid System

Figure 4:
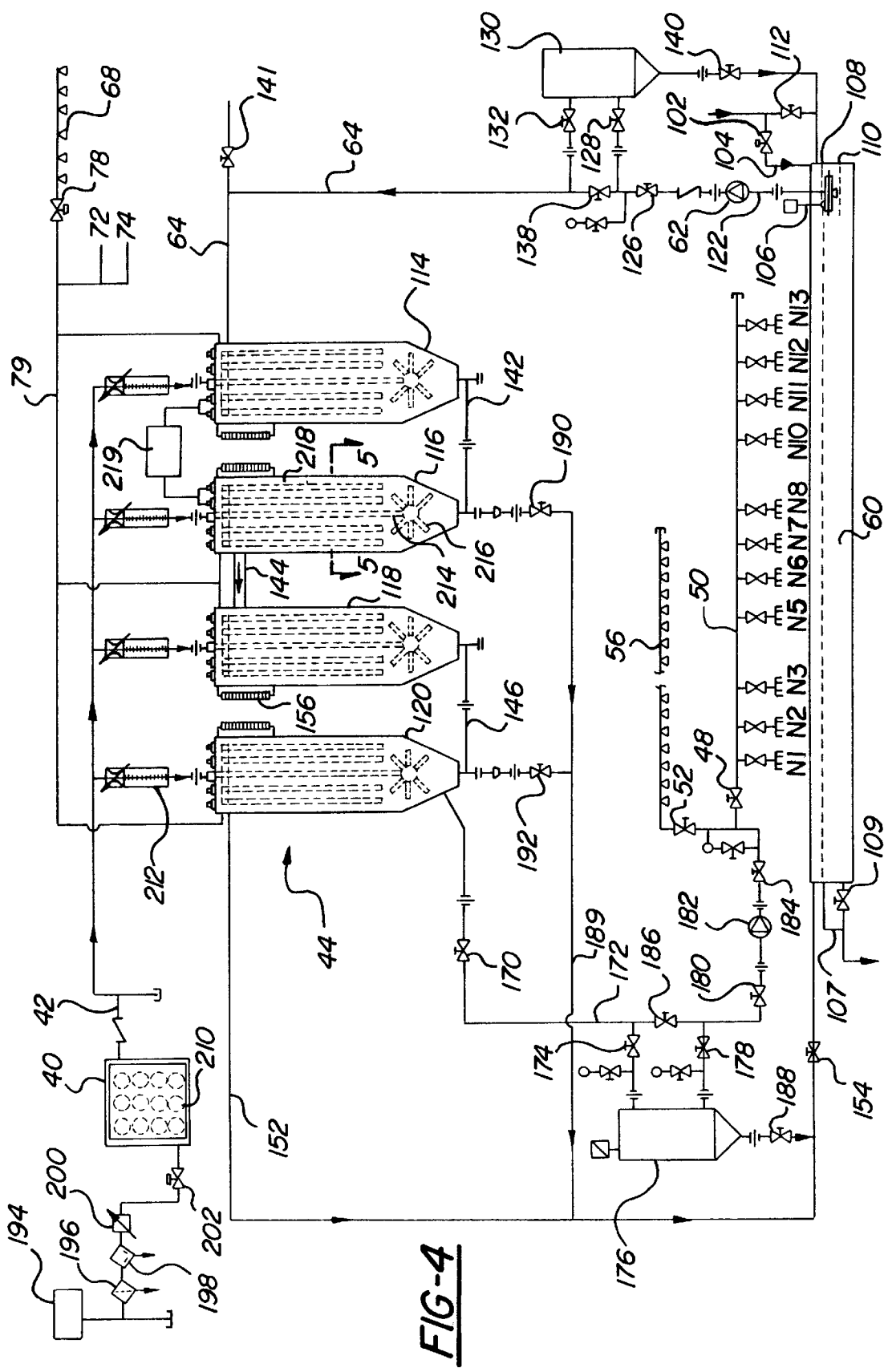
FIG. 4 is a schematic diagram of a liquid subsystem used in the air treatment system of FIG. 2 to generate activated fog and continuously recirculate liquid through the system.

Referring now to FIG. 4, fresh water, preferably filtered tap water, is supplied to tank 60 through a solenoid valve 102 and inlet pipe 104. Valve 102 is opened and closed by a suitable liquid level control, including a float-operated liquid level sensor 106 to initially fill tank 60 and maintain a liquid level between an upper limit 108 and a lower limit 110. The upper limit 108 is established by an overflow outlet pipe 107 which is also connected to a normally-closed solenoid valve 109 so that tank 60 can be drained. Fresh water can also be supplied to tank 60 via a manual valve 112. Liquid from tank 60 is supplied to four low-pressure sparger tanks 114, 116, 118, and 120 in tank farm 44 by pipe a 122, pump 62, normally-open solenoid valves 126, 128, a low-pressure filter 130, normally-open solenoid valve 132 and pipes 64 which discharge liquid into the top portion of tank 114. Filter 130 can be bypassed by a normally-closed solenoid valve 138 and drained into supply tank 60 via a normally-closed solenoid valve 140. Tank 114 can also be supplied directly with fresh tap water via a normally-closed valve 141 to flush out the system.

Liquid pumped into tank 114 is transferred by gravity to tank 116 by a pipe 142, from tank 116 to tank 118 by an overflow pipe 144, and from tank 118 to tank 120 by a pipe 146. Pump 62 is a low pressure, high capacity pump. Overflow from tank 120 is returned to tank 60 via overflow pipe 152 and a normally-open solenoid valve 154. Each sparger tank 114–120 has a sight tube 156 so that an operator can visually monitor the liquid level in each of the tanks. Sparger tanks 114–120 can be drained into tank 60 via drainpipe 189 and normally-closed valves 190, 192 when it is desired to purge or flush the system.

Liquid from tank 120 is delivered to nozzle array 56 and nozzle header 50 through piping 172, filter 176, pump 182, and normally open valves 170, 174, 178, 180, 184, 48 and 52. Filter 176 can be bypassed via a normally-closed valve 186 and drained into tank 60 via normally closed valve 188. Preferably, filter 176 traps particulates larger than 1 micron to ensure that particulates do not enter tunnel 14 and prevent clogging of the nozzles. Header 50 feeds nozzles N1–N3, N5–N8, and N10–N13 in corresponding modular sections, S1–S3, S5–S8, and S10–S13, as previously described in connection with FIGS. 1 and 2, to maintain a high humidity environment throughout tunnel 14.

As generally described in connection with the overall system of FIG. 1, the liquid supplied to nozzle header 50 and nozzle array 56 is an aqueous solution containing dispersed bubbles of oxidant-laden activated air from generator 40. As shown in greater detail in FIG. 4, compressed air is delivered to generator 40 from a source of fresh plant air 194 through a filter and coalescer 196, a compressor 198, a variable Venturi flow regulator 200 and normally-open solenoid valve 202. Filter 196 is used to remove particulate moisture and oils down to 0.01 microns in size. Air entering generator 40 passes serially through a series of individual activated air cells 210 (FIGS. 4, 6 and 7) where it is exposed to ultraviolet radiation to generate the various oxidants. Activated air from generator 40 is then delivered via header pipe 42 to each of the sparger tanks 114–120 via an associated variable flow regulator 212. Regulators 212 control the activated air entering each tank and balance the distribution to all of the tanks.

Since tanks 114–120 are of similar construction, only tank 116 will be described in detail. Compressed activated air, at relatively low volume and low pressure, enters the lower portion of tank 116 through an inlet tube 214 and a spider of sparger pipes 216. Sparger pipes 216 cause the activated air to be dispersed in minute bubbles and agitate the liquid in tank 116. As shown in broken lines in FIG. 4 and in cross section in FIG. 5, four ultraviolet lamps 218 are mounted on the top of tank 116 and extend downwardly through a major portion of the tank, terminating just above the spider sparger tubes 216. Lamps 218 also consist of an ultraviolet lamp tube, protected from the liquid in tank 116 by a separate quartz lens tube 217 and can be identical to lamps 80 used in tunnel 14. Each of the quartz lens tubes 217 are preferably made from the same high-output ozone LH material used to make lamps 218. For purposes of simplification, an electrical power source 219 is illustrated with connections to only two of the lamps 218 in each of the tanks 114, 116, it being understood that source 219 is connected to all of the lamps in all of the tanks.

As the activated air from spider sparger tubes 216 bubbles somewhat violently and migrates upwardly through tank 116, the activated air bubbles are exposed to further ultraviolet radiation to generate and reactivate oxidants. Oxidant generation and reactivation occurs not only as fresh activated air is introduced into each tank, but also as activated liquid moves progressively through the tanks. Additionally, ultraviolet radiation of the aqueous solution in tanks 114–120 is also believed to contribute to total destruction of the pollution by promoting further intermediary and radical reactions which occur after photochemical degradation of the pollutants in tunnel 14.

As mentioned above, relatively large quantities of water are required to maintain high humidity in tunnel 14. In the illustrated embodiment, tank 60 holds 1,028 gallons, with pump 62 providing 60 gallons per minute at low pressure and pump 182 delivering 12.7 gallons per minute at 1,000 p.s.i. For supplying about 12.7 gallons per minute to pump 182, tanks 114–120 may have capacities of about 113–200 gallons per tank, with compressed activated air from generator 40 being introduced into each tank at a rate of 1.5 cubic feet per minute at ten to fifteen psi per minute. Progressive circulation through tanks 114–120 as described herein insures an adequate supply of freshly activated, oxidant-laden liquid required to maintain the dense activated air fog and the high humidity in tunnel 14. Most of the piping in the low pressure portions of the system of FIG. 3 is made of PVC which is believed to provide a catalytic action for reactions occurring in the liquid as the liquid recirculates from tank 60 through tank farm 44, resides in tunnel 14 as a fog, and then is precipitated back into tank 60.

As shown in FIGS. 2 and 4, activated air that collects at the top of each of the sparger tanks 114–120 is vented to a pipe 79 that supplies the activated air to air nozzles 68 along with regenerated exhaust air that is supplied from carbon bed system via tap 74. Preferably about 100–120 cubic feet per minute is delivered to nozzles 68, with tanks 114–120 supplying about 12–16 cubic feet per minute at 10 psi and about 90–100 ACFM through tap 74.

Activated Air Generator Cells

Referring to FIGS. 6 and 7, there is illustrated in greater detail one of the generator cells 210 in generator 40. Each cell includes an ultraviolet lamp 220, which can be the same as lamps 80 in tunnel 14 and lamps 218 in tank farm 44. Each lamp 220 is generally concentrically retained in a tubular outer casing 221 of its associated cell 210. Compressed air from generator 40 enters cell 210 through an inlet fitting 226 on an end cap 222 and is exhausted from cell 210 through an outlet fitting 228 on an end cap 224. Lamp 220 is carried on a subassembly 230, slidably received in casing 221 and comprising a plurality of baffle plates 232 which provide a serpentine flow path that introduces turbulence into the air stream flowing through cell 210. Baffles 232 are mounted on three rods 234 that are spaced apart and extend axially within casing 221 about lamp 220. Each baffle 232 is generally a circular disk having a cutaway flat edge 236 and the baffles are mounted on rods 234 with alternating flats 236 facing in opposite directions to provide the serpentine flow path. All of the baffles 232, except one end baffle 232', have a central clearance hole 238 through which lamp 220 is received, with one end of lamp 220 being received in and supported by a socket 240 on end baffle 232'. Lamp 220 is energized at its other end via terminals 242, 244, wires 246, 248 and socket 250.

Casing 221 has an inside diameter-to-axial length ratio of between 1 to 8 and 1 to 16, and preferably about 1 to 12. To insure turbulent flow, preferably the baffles 232 are equidistant and at a distance of between one-half and one-times the inside diameter of the casing 221. Preferably the area of the cutaway flaps 236 is not greater than about 10% of the baffle plate area to enhance turbulent flow and to provide a scrubbing action. Preferably casing 221, end caps 222, 224, baffles 232 and retainer rods 234 are made of PVC for the reasons set forth above to resist oxidation and also, it is believed, provide a catalyst from exposure to the ultraviolet radiation. With this construction, the baffles 232 are cemented to rods 234 and the subassembly 230 tacked to casing 221 with PVC cement.

In one practical construction of the generator cell 210, casing 221 is made from commercially available PVC tubing having a nominal outside diameter of six inches and, with end caps 222, 224 an overall length of about 5½ feet. The baffle subassembly, also made of PVC, had 14 baffles having a diameter of about six inches and a thickness of 3/16 of an inch. About 3/8 of an inch was removed to form flaps 236. A suitable ultraviolet lamp tube having an overall length of about 61 inches is commercially available from Voltare Technologies of 186 Linwood Avenue, Fairfield, Conn. 06430.

A generator 40 of twelve of these cells connected in series had an output of about 42 standard cubic feet per minute when operated with a compressed air inlet pressure of about 20 psi. The activated air produced by this generator is believed to typically have same the oxidants as other radicals in the proportions set forth in Tables 2 and 3. No bacterial maintenance is required because of the biological treatment by ultraviolet radiation by lamps 220 in cells 221, lamps 218 in tank farm 44, and the numerous ultraviolet lamps in chamber 14.

Carbon Bed Regeneration

In prior applications using carbon beds for V.O.C. abatement, when low concentration, high volume air is passed through the carbon bed, the V.O.C.s are absorbed into the bed. The bed is later desorbed by steam, etc., yielding a higher concentration, smaller volume effluent which must then be further processed by incineration or other solvent removal techniques. For some prior applications, carbon bed desorption must be performed offsite, and other prior applications require offsite disposal of waste products. Moreover, when using the method and apparatus of the present invention, carbon beds may not be required for all applications where treatment in tunnel 14 has reduced pollution levels sufficiently to meet applicable standards. When carbon beds 32, 34 are utilized according to the present invention, they may be constructed in a manner similar to that of prior art carbon beds. However, the utilization and function of carbon beds according to the preferred embodiment of the present invention differs significantly from prior art carbon beds used only as an absorber.

Referring back to FIG. 2, it will be remembered that in the preferred embodiment, the air stream exiting tunnel 14 has just been reactivated with ultraviolet radiation in chambers C14 and C15 and filtered by carbon filters in modular section 15. The air stream entering expansion chamber 22 is still highly active with oxidants, together with some pollutants and, most likely, intermediate compounds resulting from photochemical and oxidative degradation in tunnel 14. Continued oxidant activity at a high level can be maintained by using additional ultraviolet lamps in expansion chamber 22.

Preferably two carbon beds 32, 34 of modular construction and assembled off-site are used. During final on-site assembly, beds 32, 34 are enclosed by a suitable external housing, generally designated at 266 and isolated from each other by an internal partition 267. An inlet chamber 268 for bed 32 is connected to expansion chamber 22 via an inlet duct 270 and an inlet damper 272. Exhaust from bed 32 to an exhaust stack 26 is through an outlet duct 274 and outlet damper 276. Similarly, an inlet chamber 277 for bed 34 is connected to expansion chamber 22 via a duct 280 and damper 282 and bed 34 is exhausted to stack 26 through an outlet duct 284 and outlet damper 286. Bed 32 is brought on-line by opening dampers 272, 276 and closing dampers 282, 286 and bed 34 is brought on-line by opening dampers 282, 286 and closing dampers 272, 276. Each of the carbon beds 32 and 34 include a respective template 290 and 292 located just upstream of dampers 276 and 286, respectively. Each of the templates 290 and 292 provides a restriction in the flow path that results in a backpressure within its associated carbon bed. This backpressure equalizes the flow through the carbon filters to help maximize the effectiveness of the carbon beds. Each of these templates can be implemented using a pair of perforated plates with the degree of alignment of the perforations being varied as necessary to obtain the desired backpressure.

Referring also to the schematic of FIG. 8, blower 30 draws fresh plant air 300 through a filter 302 and into generator 28 through a five-port manifold 304. Each port of manifold 304 feeds a respective row of seven serially-connected activated air cells 306 whose exhaust streams flow through respective solenoid operated valves 308 to a five-port exhaust manifold 310 and then through piping 312 to the inlet of blower 30. Blower 30 delivers compressed air at about 300 ACFM to activated air tap 72 via delivery piping 314 and solenoid valve 316; to perforated tube arrays 320, 321 in carbon bed 34 via piping 314 and respective solenoid valves 318, 319; and to perforated tube arrays 326, 328 in carbon bed 32 through piping 314 and respective solenoid valves 322, 324. Preferably, each of the perforated tube arrays 320, 321, 326, and 328 has multiple rows of perforated outlet tubes, for example arranged in a vertical array of three tubes 330, 332, 334, as shown in FIG. 9 for the array 328. This arrangement uniformly disperses activated air into the carbon beds during regeneration. In the exemplary embodiment being described, each carbon bed 32, 34 can be fabricated in two modular sections, each about 30 ft. long ×10 ft. wide ×10 ft. high and finally assembled on site end to end into a 60 ft. unit. The carbon bed base material can be 500 cu. ft. of natural grain coconut activated carbon shell.

As discussed above in connection with generator 40, the generation of activated air is preferably carried out using humid air. Thus, humidity can be added to the fresh plant air 300 used by generator 28. Optionally, the cleaned process air exiting carbon bed system 24 can be used in lieu of plant air 300 and can therefore be taken directly from stack 26 via a supply line 336 shown in FIG. 1. This cleaned process air is well filtered and rises to a humidity level of approximately 95% after only three minutes of operation of air treatment system 10. Thus, the cleaned process air neither requires added humidity nor filtering and filter 302 can therefore be eliminated.

As shown in FIGS. 2 and 8, regeneration exhaust gases from carbon bed 34 are delivered to supply tap 74 through a pair of solenoid valves 340, 342, exhaust header 344, piping 346 and solenoid valves 348, 350. Regeneration exhaust gases from bed 32 are similarly delivered to tap 74 through a pair of solenoid valves 352, 354, header 344, piping 346 and solenoid valves 348, 350. Exhaust manifold 344 may also be directly connected to stack 26 through piping 346, valve 348 and a solenoid valve 356 for applications where the regeneration exhaust is sufficiently clean for exhausting it directly into the environment.

Advantageously, activated air supplied to the carbon beds 32, 34 during regeneration not only desorbs the carbon beds but also deposits oxidants on carbon bed surfaces for further destruction of the pollution by surface reactions when the regenerated carbon bed is brought on-line. Consequently, it is also desirable to recirculate the regeneration exhaust gas from carbon beds 32, 34 through tap 74 and back into tunnel 14 to promote continuing intermediary reactions and destroy any remaining pollutants and their decomposition products.

Cells 306 in generator 28 can be constructed substantially as described in connection with cells 210 in generator 40. Cells 306 are serially connected in six respective rows so that the number of cells on-line can be selected via valves 308 according to the system demands for regenerating either cell 32 or 34 and also according to the system demands for supplying activated air via valve 316, tap 72, and valve 78 to activated air nozzles 68 in tunnel 14. Blower 30 has a variable speed control (vfd) 370 so that the output from blower 30 can be varied in accordance with system demands.

Photochemical and Oxidation Reactions and Results

Based on testing of the air treatment system, it has been demonstrated that the air treatment air treatment system of the present invention effectively destroys pollution of the type encountered in exhaust air from industrial processes. Much of this testing was done to simulate a percentage ratio based on a commercial unit which could handle 72,000 cfm at 45 lbs. of V.O.C.s per hour. In order to get representative results for paint spray solvents, the results shown in Table 4 are for a ratio of two parts methylamylketone (MAK) to one part Xylene. Although the pathways of oxidative degradation and V.O.C. destruction have not been completely elucidated, the various reactions occurring for these solvents are known and the results of Table 4 show that the present invention can successfully reduce or destroy pollutants.

As one example of V.O.C. degradation, the following reactions show methane ($CH_4$) reduction by hydroxyl ($HO^{\bullet}$). As shown, this is accomplished by replacement of each hydrogen atom. The first step is formation of methyl alcohol ($CH_3OH$ or $H^{\bullet}CH_2OH$), followed by formation of formaldehyde ($HC_2(OH)_2$) which, by loss of water gives $CH_2O$ or $H^{\bullet}CHO$, and, finally, formation of formic acid ($CH(OH)_3$) which, by loss of water gives $CHO(OH)_2$, $HO^{\bullet}COOH$, or $H_2CO_3$.

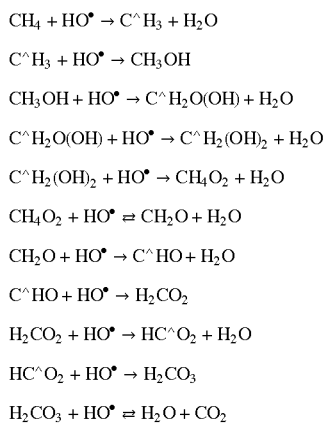

It should be noted that the above reactions are representative of hydroxyl intrusion only and that they do not consider any reactions or enhancements of reactions that may occur due to intrusion of the ultraviolet light, other radicals and oxidants in the activated air, as well as electron/photon transfer. A similar process of chemical reduction to water and carbon dioxide is believed and expected to occur with similar compounds, such as: N-butyl alcohol; aromatic hydrocarbons; mineral spirits; 1,1,1 trichloroethylene; BTX's in light ppm; methanol; MEK; V, M, and P, Naptha; N-butanol; perchloroethylene; and butyl ether.

As indicated earlier, it is strongly believed that V.O.C. destruction into harmless water and carbon dioxide is achieved by the combination of two phenomena undoubtedly producing a synergistic effect. First, ultraviolet radiation produces highly active oxidants which then subsequently oxidatively degrade the pollutants. The oxidants are generated not only in the activated air from generators 28, 40 but they are reactivated, regenerated and freshly generated by ultraviolet radiation in the sparger tank farm 44 and within the numerous chambers in tunnel 14 having ultraviolet lamps. Generation of the activated air is carried out in a high humidity environment and using ultraviolet wavelengths of 184.9 nm to produce ozone and 254 nm to help quickly break down the ozone so that the liberated oxygen can form highly active hydroxyl radicals. The generation of activated air is also carried out in the presence of a catalyst to help liberate hydrogen for hydroxyl radical production.

Oxidants in the activated air from generator 28 are deposited on surfaces in carbon beds 32, 34 during carbon bed regeneration and for surface reaction with pollutants when the carbon beds are brought on-line in the process. These surface reactions can be enhanced by additional ultraviolet radiation in expansion chamber 22, just before any remaining pollution in the air stream are passed through carbon beds 32, 34. Secondly, direct ultraviolet photolysis of the pollution causes a photochemical decomposition of the pollution, with the resulting products interacting with the oxidants and chemical intermediates constantly being generated, reactivated and reacting throughout the system.

It should also be apparent that ultraviolet radiation for photodecomposition and for oxidant generation takes place under a variety of conditions. In tunnel 14, ultraviolet radiation occurs in the various heavily fogged chambers and also in chambers where, after particulate water is filtered, only high gaseous humidity is present in the chambers just before the carbon filters. Residence time varies in different chambers. Ultraviolet radiation impinges directly on catalyst plates and other PVC components and on carbon filters where surface reaction can occur. Heavy homogeneous mixing occurs at cone array 70 and heavy scrubbing occurs at the perforated catalyst plates. Varying degrees of turbulence also exist in tunnel 14 due to the different filter arrangements and particularly the perforated catalyst plates, as well as the effect of the nozzle sprays and diversion around the lamp shields. Experimentation has shown that oxidant production, as well as V.O.C. destruction, is enhanced by catalytic action provided, in the example described hereinabove, by the PVC. In addition to the lamp shields and catalytic plates, various other internal supports that are exposed to the ultraviolet lamps within tunnel 14 can be made of catalytic materials. For example, PVC pipe can be used in the frame structure that supports the ultraviolet lamps and can be used for piping of the activated air and the oxidant-laden aqueous solution created in tank farm 44. Due to the high level of oxidants present in the system, slight oxidation of the PVC may also be occurring, with some reaction products entering the system. Indeed, analysis has yielded some reaction products confirming this and, after extended use, a slight surface erosion can be detected at some of the PVC components.

When either carbon bed 32 or 34 is on-line, oxidants are continuously deposited onto the surface of the carbon bed for continued destruction of any V.O.C.s remaining in the air stream passing through the carbon bed. During regeneration, oxidants produced by activated air generator 28 are not only deposited on the carbon bed for destruction of pollutants when the carbon bed is brought on-line but, additionally, regeneration exhaust is recirculated back into tunnel 14 for further reactivation. At sparger tank farm 44, an aqueous solution is irradiated as the air bubbles through the sparger tank and the solution moves from tank to tank and then into tunnel 14 so that the fog or mist delivered into tunnel 14 is highly active with oxidants. Particulate water filtered out of tunnel 14 and otherwise precipitated into tank 60 is believed to still be sufficiently active to contribute to reactions occurring in tank 60. Dissolved oxidants and intermediary compounds are recirculated through sparger tank farm 44 to be exposed to ultraviolet radiation and recirculated into tunnel 14.

Some of the oxidants produced by ultraviolet radiation at generators 28, 40 and in sparger tanks 44 and in tunnel 14, are potent oxidizing agents but their life as a radical, for example the hydroxyl radical, may be relatively short, depending on the competition for reaction and recombination throughout the system. Hence, for high-volume industrial processes, oxidant production is continuous throughout the system by repeated exposure to ultraviolet radiation and by the introduction of fresh oxidants from generators 28 and 40. Also, the various oxidants available in abatement system 10 are available not only for direct reaction with photodecomposed pollutants, but they serve as intermediate radicals in radical to radical reactions as various chain reactions occur in the system. In any event, the desired end result of total destruction of pollutants is achieved, yielding final end products of carbon dioxide and water.

Since water is a necessary part of the system operation and processes, generation of water has a beneficial result, leaving only the relatively harmless carbon dioxide to be dealt with, at least from a theoretical standpoint. Analysis to date has not determined the fate of carbon dioxide, if any, generated by abatement system 10. Although some experimentation has shown expected increases of $CO_2$, anticipated increased presence of $CO_2$ at exhaust stack 26 cannot effectively be detected. This would be desirable for direct comparison of the destruction efficiency by the present invention relative to the destruction efficiency by incineration, whose end products are also carbon dioxide and water. However, with the system of the present invention, the absence of a detectable expected increase in $CO_2$ at exhaust stack 26 has several possible explanations. First, it is possible, but unlikely, that no carbon dioxide is produced by the system. Secondly, in an oxidant-enriched environment, carbon dioxide might well react according to the following reaction scheme as suggested in the aforementioned Chemical Review article:

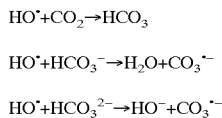

$$HO^{\cdot}+CO_2 \rightarrow HCO_3$$

$$HO^{\cdot}+HCO_3^- \rightarrow H_2O+CO_3^{\cdot-}$$

$$HO^{\cdot}+HCO_3^{2-} \rightarrow HO^-+CO_3^{\cdot-}$$

In a hydroxyl radical enriched environment, any bicarbonate or carbonate which is formed by the interaction of water or hydroxide with $CO_2$ can react with the hydroxyl radical to give a carbonate radical anion. This radical anion is itself an oxidant, although of less oxidation potential than the hydroxyl radical. Thirdly, carbon dioxide is readily absorbed into the carbon beds 32, 34 and this absorbed carbon dioxide is not easily displaced but it will slowly release over time. Finally, because of the large amount of water present in and passed through sparger tank farm 44, carbon dioxide may be made "solubleized" into the aqueous phase and never appear at exhaust stack 26.

As discussed above, no detectable levels of ozone are present in the activated air produced by generators 28 and 40. Moreover, no ozone is generated in sparger tank 44 because the air is dissolved in an aqueous solution and no ozone is generated in tunnel 14 due to the fog and high humidity present throughout the tunnel. This is believed to result from one or more of the following phenomena: decomposition of ozone due to the presence of high humidity; selection of ultraviolet light wavelengths, and the presence of radicals from the PVC catalysts. It is generally believed that, in a dry environment, ultraviolet radiation at wavelengths shorter than about 220 nanometers will produce ozone and decompose $O_2$ into $O_1$. It is also believed that ultraviolet radiation at a wavelength of 184.9 nanometers is particularly effective in producing ozone. It is further believed that ultraviolet radiation at wavelenght of 254 nanometers decomposes ozone. The ultraviolet lamps used in practicing the present invention have a spectral wavelength distributed between 184 and 254 nanometers, with the 184.9 nm light helping to generate ozone and the 254 nm light helping to break down that ozone. The lamps are relatively low wattage, for example 0.425 amps at 120 volts for each lamp in each of the cells 306 in generator 28 and cells 210 in generator 40. Similarly, each of the lamps used in tunnel 14 and sparger tank farm 44 is relatively low wattage.

It is expected that the process of the air treatment system of the present invention can be optimized for a wide range of pollutants by varying the amount (higher wattage) and radiation wavelengths, either distributed over different wavelength ranges or possibly even monochromatic radiation at selected wavelengths. By using modular sections such as sections S1 through S15, when new technology is developed, it can easily be retrofitted to an existing system. Exposure time to ultraviolet radiation in tunnel 14 can be varied by varying the number and length of chambers included in the tunnel and by varying the turbulence in various chambers.

PRE-TREATMENT SYSTEM

Overview of the Pre-Treatment System

Referring again to FIG. 1, pre-treatment system 400 is used to process air stream 12 before it enters air treatment system 10. In general, pre-treatment system 400 is used to introduce activated air and the activated aqueous solution into air stream 12. It is also particularly advantageously used with air streams that have an elevated temperature as a way of reducing the temperature of the air stream so that it may safely enter air treatment system 10.

This processing of air stream 12 as a pre-treatment is useful for a number of reasons. First, it can be used to create high humidity for the formation of hydroxyls and other oxidizing agents in the air stream. Second, it creates an atmosphere that begins a condensing effect in the air stream to wet the V.O.C.s, CO, and NOx, thereby allowing the miscible and water soluble compounds to be captured in the activated water. This allows them to be moved to sparger tank farm 44 for u.v. and oxidation exposure. Third, it introduces the hydroxyls, peroxides, hyperperoxys, ozone, atomic oxygen and other radicals into the contaminated air stream.

Although advantageous as a pre-treatment process, system 400 can be used as a stand-alone system. Furthermore, it can be used as an add-on to other systems, either as a pre-treatment of the air stream or a polishing step for the exhaust from other abatement systems. In particular, it can be used in conjunction with WESPs (wet electrostatic precipitators), EPs (electrostatic precipitators), RTOs (regenerative thermal oxidizers), RCOs (regenerative catalytic oxidizers), and carbon absorption wheels.

As shown in FIG. 1, air stream 12 enters the system in a quenching section, designated zone A. As will be discussed in greater detail below, activated aqueous solution generated by sparger tank farm 44 is misted into the air stream in zone A. This is done to lower the temperature in the air stream (if necessary) and to wet the compounds with activated aqueous solution. This wetting is done to start the oxidation process in addition to chilling the air and condensing the V.O.C.s, NOx, and CO in the air stream. The air stream then passes alternately through reaction zones B and D (where activated air from generator 40 is introduced), and depletion zones C and E (where the air stream and activated air are turbulently mixed together).

Construction and Use of the Individual Zones

Referring now to FIG. 10, there is shown a longitudinal cross-section of quench zone A. Quench zone A includes a duct 402 having a circular cross-section and an inlet end 404 and outlet end 406. Mounted on the inside surface of duct 402 are four water manifolds 408a–408d (only three shown) that extend the length of zone A. Each manifold has a number of nozzles 410 along its length. The nozzles are directed toward the interior of duct 402. The water manifolds each have supply branch 412a–d (only two shown) that extend through the duct wall to a supply manifold 414. supply manifold 414 is connected to receive activated aqueous solution from sparger tank farm 44 (e.g., by being connected to the junction of valves 48 and 52 of FIG. 4). Of course, a separate water generating system could be used, such as that disclosed in U.S. Ser. No. 08/575,642, filed Dec. 20, 1995 and assigned to the assignee of the present invention. At the bottom of duct 402 is a drain and tap 416 that is used to collect condensed activated aqueous solution, along with the pollutants contained therein, and return the water to tank farm 44 for recycling and exposure to additional oxidants and u.v. lighting.

FIG. 11 depicts the view from an inlet 404' of another preferred embodiment of quench zone A in which six water manifolds 408a–f are distributed around the interior circumference of duct 402'. The water manifolds can be ½ inch stainless steel pipes mounted on the inside surface of duct 402' with 15 to 30 spray nozzles mounted to the manifolds. The number of water manifolds and spray nozzles can be increased or decreased depending upon the desired flow rate of aqueous solution into zone A. The supply manifold can be a one inch stainless steel manifold mounted to the outside. Duct 402' can be 16 gauge 304 stainless steel duct with a 42 inch diameter and a mounting flange on each end. Preferably, zone A as well as the other four zones each have a length of between ten and fifteen feet.

For a typical exhaust air stream of 20,000 A.C.F.M., air entering zone A would be quenched at a rate of 20 G.P.M. to 35 G.P.M. as required by temperature demands and NOx, V.O.C., and Co concentration. This quenching process captures the water soluble and miscible compounds allowing movement of the entrapped volatiles either back to tank farm 44 or to another suitable water treatment apparatus. The recirculation of the aqueous solution back to tank farm 44 allows the reduction and/or destruction of these compounds to take place in a controlled environment.

The reaction zones B and D allow the exhaust air to be injected with activated air containing such oxidants as atomic oxygen, hydroxyls, peroxides and some other highly active radicals. Preferably, for an exhaust air stream of 20,000 A.C.F.M., activated air would be introduced at a rate of 1,200 cfm and would be injected at various points in the system.

Figure 12:
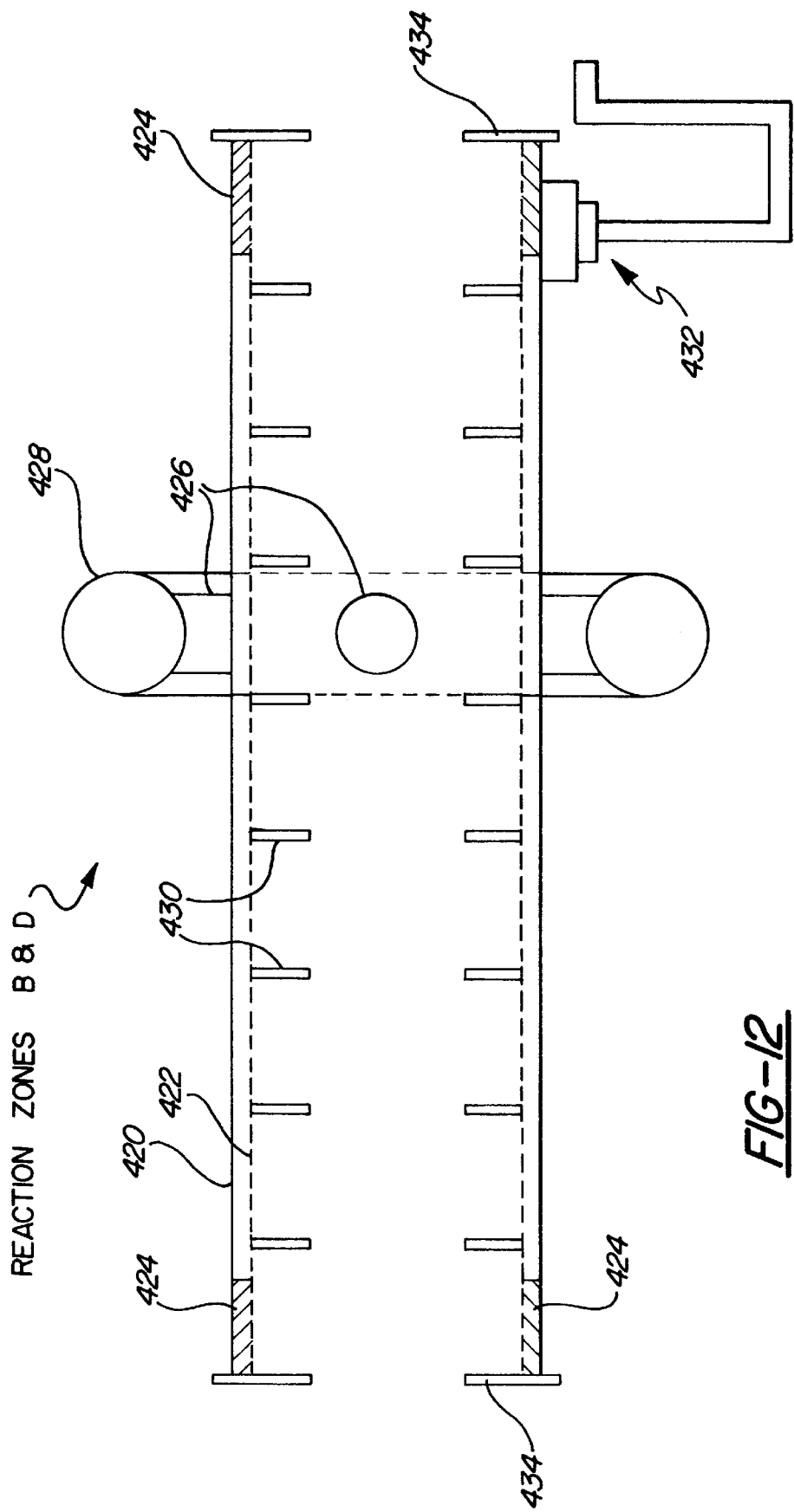
FIG. 12 is a cross-sectional view of the reaction zones of FIG. 1.

Referring now to FIG. 12, one of the two identical reaction zones B and D are shown. These zones are used to introduce activated air into the air stream and to thoroughly mix the air stream and activated air as it moves along the zone. The reaction zone includes an outer duct 420 and an inner perforated duct 422 that is spaced from the outer duct by four spacer bars 424 (only two shown) at each end of the zone. The two ducts define a supply plenum therebetween with the perforations allowing air from the supply plenum to move into the passageway defined by inner duct 422. The supply plenum receives activated air from three supply branches 426 that are connected to a single air supply manifold 428. The supply manifold is connected to the activated air generator 40 used in the air treatment system 10 or to a dedicated activated air supply, as is desired. Each reaction zone is also equipped with a water drain 432 to return accumulated water to tank farm 44.

To help insure proper wetting and mixing of the pollutants with the activated air and aqueous solution, the reaction zone includes a series of annular baffles 430. These baffles constrict the flow of the air stream and cause turbulence in the intervening spaces between the baffles.

In the illustrated embodiment, outer duct 420 is 44 inches in diameter and inner duct 422 is 42 inches in diameter. Both ducts are constructed of 16 gauge 304 stainless steel. The inside duct is perforated with sixteen ⅛ inch holes to the square foot. Spacer bars 424 can have a one inch square cross section.

For purposes of fabricating the reaction zone, the baffles are placed inside the perforated duct and welded in place at 18 inch intervals. These baffles have 42 inch outside diameter and a hole in the center with 36 inch diameter. The outside duct is equipped with three mounting flanges of 304 stainless steel for an air-tight connection to the three supply branches 426 from air manifold 428. This allows the supply plenum to be pressurized high enough to overcome the pressure in the exhaust air stream. Once the baffles are in place, the spacer bars can be attached to the inner duct with the outer duct then being placed over the spacer bars and inner duct. The assembly can then be welded to a mounting flange 434 at each end.

The function of the supply plenum is to introduce the activated air by injection through the ⅛ inch holes in the perforated inner duct at a rate of 5,341 fpm (feet per minute) into the exhaust stream. A dual purpose is served by having the exhaust stream travel through the 36 inch holes in the baffles at a speed of 2,829 fpm at 20,000 A.C.F.M. and then expanding in the chambers between the baffles into the low pressure zone where it travels at a speed of 2,079 fpm. First, the compression of the stream through the baffles in the highly moist air aids in the wetting of volatile compounds and cooling of the exhaust stream. Secondly, the baffles with the high compression rates and the expansion between the baffles creates a highly turbulent area creating high mixing zone for the exhaust air and the activated air.

The activated air supplied to the reaction zones can be at temperatures ranging from 32° F. to 350° F., with a preferred range from 100° F. to 260° F.

Figure 13:
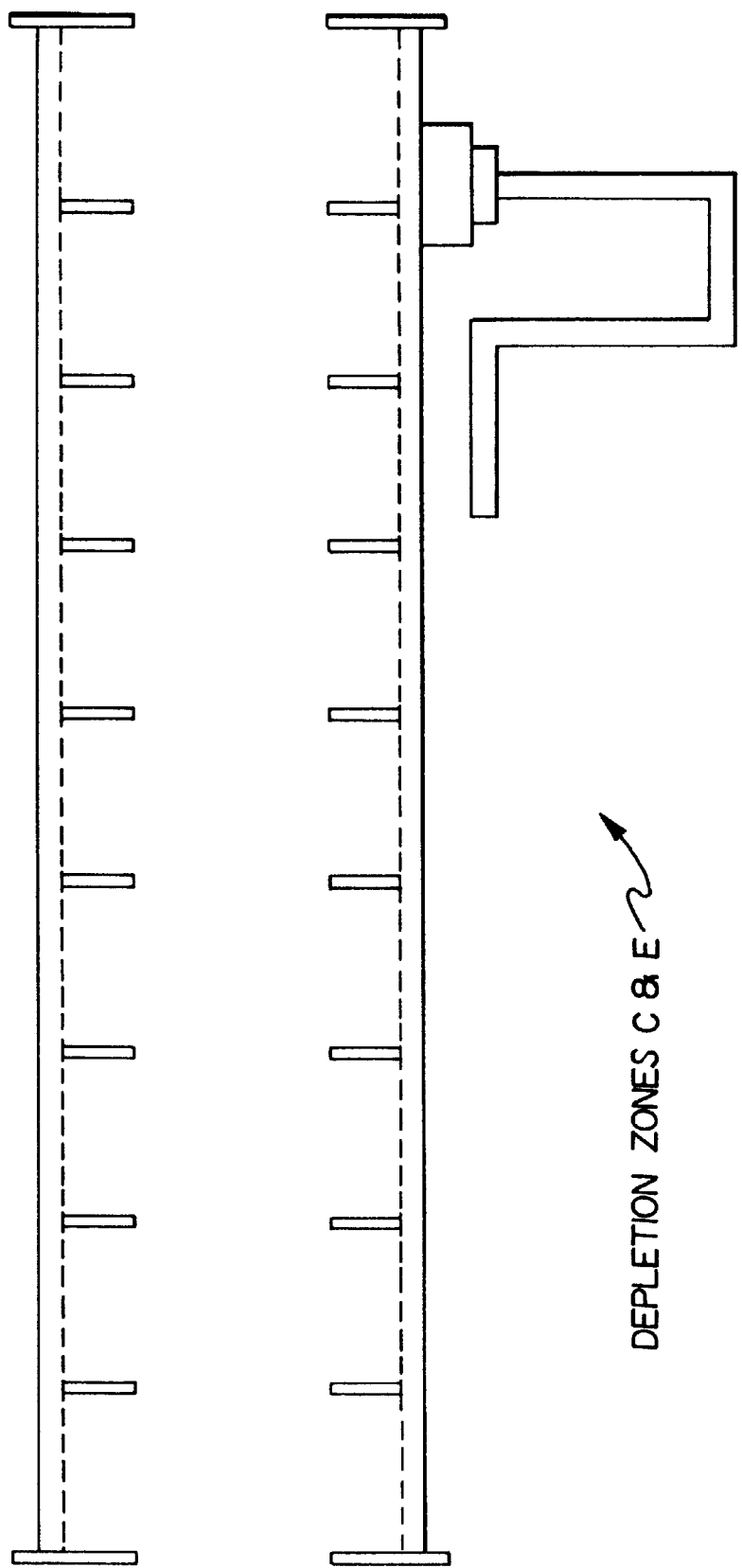
FIG. 13 is a cross-sectional view of the depletion zones of FIG. 1.

With reference now to FIG. 13, one of the two identical depletion zones C and E are shown. The depletion zones are designed to allow the activated air and volatile compounds to interact with each other to obtain the most oxidation possible. The repeated sequence of zones enhances destruction efficiency by increasing exposure of volatiles. The depletion zones can be constructed the same as the reaction zones, except that no supply branches or manifolds are needed since there is no activated air injected in these zones. The inner/outer duct, baffle, and drain arrangement of the reaction zones can still be used in the depletion zones, as indicated in FIG. 13. Preferably, there are sixteen ¼ inch perforations to the square foot for the inner duct.

The depletion zones are constructed so as to allow for compression through the baffles 36 inch diameter orifice and high turbulent mixing between the baffles in the low pressure area allowing the activated air and volatiles to interact with each other for as long as possible and to deplete as many volatile compounds as possible. This also allows capture of many water soluble compounds enabling them to be transported to the sparger tank farm for destruction.

The air abatement system has been designed to work at a variety of air flows to enable its adaptation to multipurpose applications, where the exhaust air flows range from 5,000 A.C.F.M. to 75,000 A.C.F.M. Operation is estimated to be effective at an internal velocity range of 1,800 fpm to 3,500 fpm, with the range of 2,250 to 2,850 fpm expected to be the most efficient. These ranges will be achieved by adjusting the size of the duct and/or the spacing of the baffles.

Various other modifications to the illustrated arrangement of zones can be used to achieve the desired level of pollutant destruction and oxidation. For example, additional zones (whether quenching, reaction, or depletion) can be added to prolong the exposure of the pollutants to the activated air and aqueous solution.

As a pre-treatment process, system 400 allows the exhaust stream to enter the air treatment system preoxidized which aids in the process of reducing remaining compounds. The ability to accomplish this at a controlled temperature allows the air treatment system to address more of the high boilers and also lower the energy consumption and cost of the overall system. This results in the reduction of thermal pollution and release of volatile compounds that impact the environment.

The use of pre-treatment system 400 is particularly useful in the abatement of NOx contained in the exhaust from wood processing and other industrial ovens. In destroying NOx from such exhaust air, quenching zone A is first used to wet the pollutants, lower the air stream temperature, and begin oxidative destruction. Then one or more reaction zones are used to add and mix activated air with the air stream.

The present invention effectively and efficiently achieves the desired end products, namely water and, it is believed, some $CO_2$. No nitrous oxides, ozone and other objectionable pollutants, including thermal pollution, are exhausted into the environment. Original installation costs are competitive with competitive systems for a variety of reasons. System components and system design do not have to meet the demands of high temperature systems such as incinerators. Smaller carbon beds can be used because substantial reduction and destruction of the pollutants occur in the tunnel and this destruction continues in the carbon bed by surface reactions with oxidants from the generator. The apparatus of the present invention is constructed with relatively inexpensive materials including extensive use of low-cost, commercially available PVC pipe.

Operating and maintenance costs are also reduced as compared to competitive systems. No special chemicals are required as might be used for chemical V.O.C. destruction. Indeed, the only "starting" materials are tap water and plant air. The oxidants utilized, for example as shown in Tables 1 and 2, represent 20% of the atmosphere. Carbon bed regeneration time is reduced by using activated air, regeneration is done on site and no large quantities of waste by-products need to be hauled away for offsite treatment and/or disposal. In this regard, with the present invention it has been noted that some small granules about the size of a grain of fine sand eventually collect in tank 60, but the quantity produced is insignificant and possibly due to some incidental mineralization occurring in the process. Energy efficiencies are expected to compare favorably with incineration, even though that comparison has not been quantified to date.

It will thus be apparent that there has been provided in accordance with the present invention a method and apparatus for abatement of pollutants which achieve the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

We claim:

1. A method of treating an air stream containing at least one pollutant, comprising the steps of:

exposing a supply of humid air to ultraviolet radiation to produce a supply of activated air having hydroxyl radicals and essentially no ozone contained therein, forming an aqueous solution having at least some of said activated air dispersed therein, passing the air stream through a first zone, misting said aqueous solution into said first zone to thereby form a polluted aqueous solution containing at least some of the pollutants, removing at least some of said polluted aqueous solution from said first zone and introducing additional activated air into said polluted aqueous solution, passing the air stream from said first zone through a series of additional zones, and introducing activated air into at least some of said additional zones as the air stream passes therethrough without adding additional aqueous solution to said air stream, whereby the air stream passing through said additional zones is directly exposed to additional activated air.

2. The method of claim 1, wherein the air stream includes a pollutant selected from the group consisting of V.O.C.s, NOx, and CO.

3. An apparatus for treating an air stream containing pollutants, comprising:

a plurality of zones, each of said zones having an inlet and an outlet and at least one wall defining an air passage between said inlet and said outlet;

a first of said zones having a plurality of water nozzles directed towards said air passage;

an activated air generator producing a supply of activated air having hydroxyl radicals and essentially no ozone contained therein, said generator having an ultraviolet light contained in a housing, and an inlet connected to a source of humid air and an outlet;

an activated water generator having a first inlet for receiving a supply a water, a second inlet coupled to said outlet of said air generator to thereby introduce activated air into the water, and an outlet coupled to said nozzles; whereby activated water can be misted into said air passage via said nozzles;

said first zone having a drain coupled to said water generator to continuously recirculate said water through said water generator and said first zone; and a second of said zones having its inlet coupled to the outlet of said first zone, said second zone having an inner duct defining said air passage and an outer duct defining a supply plenum between said inner and outer ducts, said supply plenum being coupled to receive activated air from said air generator, said inner duct having perforations therein to thereby permit activated air to be injected into said air passage for direct exposure of the air stream to additional activated air.

4. An apparatus as defined in claim 3, wherein said second zone includes a series of spaced baffles, said baffles forming a restricted flow path through said second zone.

5. An apparatus as defined in claim 3, further comprising an air treatment system connected to the outlet of a last one of said zones to thereby receive the air stream as it exits said last zone;

said air treatment system comprising:
- a walled tunnel having an inlet for receiving the air stream, a plurality of chambers spaced along said tunnel, and an outlet for discharging exhaust air after treatment in said tunnel,
- said tunnel being arranged and constructed to confine the air stream moving along a path through said tunnel,
- at least one of said chambers comprising a plurality of nozzles coupled to the outlet of said water generator and oriented to spray said water into said one chamber to introduce an activated fog into the air stream,
- a plurality of ultraviolet lamps carried in said one chamber to expose said air stream and activated fog to ultraviolet radiation in said one chamber,
- a liquid extractor for removing particulate water from said air stream as it moves out of said one chamber and into a downstream contiguous chamber, and
- a second plurality of ultraviolet lamps carried in said downstream chamber to expose said air stream to ultraviolet radiation in the absence of additional particulate water.

* * * * *